(12) United States Patent
Frolov

(10) Patent No.: US 12,290,955 B2
(45) Date of Patent: May 6, 2025

(54) ADJUSTABLE BEVEL ANGLE STOPS WITH QUICK RELEASE AND OVER-RIDE FEATURES

(71) Applicant: Robert Bosch GmbH, Stuttgart (DE)

(72) Inventor: Andrew Frolov, Glenview, IL (US)

(73) Assignees: Robert Bosch Tool Corporation, Mount Prospect, IL (US); Robert Bosch GmbH, Stuttgart (DE)

( * ) Notice: Subject to any disclaimer, the term of this patent is extended or adjusted under 35 U.S.C. 154(b) by 335 days.

(21) Appl. No.: 17/065,993

(22) Filed: Oct. 8, 2020

(65) Prior Publication Data
US 2022/0111549 A1   Apr. 14, 2022

(51) Int. Cl.
*B27B 5/36*      (2006.01)
*B23D 45/06*     (2006.01)

(52) U.S. Cl.
CPC .............. *B27B 5/36* (2013.01); *B23D 45/062* (2013.01)

(58) Field of Classification Search
CPC .... B23D 45/062; B23D 45/06; B23D 45/061; B23D 45/065; B23D 45/066; B23D 45/067; B23D 45/068; B23D 47/00; B27B 5/36; B27B 4/182; B27B 4/181; B27B 4/185; B27B 4/20; B27B 4/202; B27B 4/203; B27B 4/222; B27B 4/22; B27B 4/24; B27B 4/243
See application file for complete search history.

(56) References Cited

U.S. PATENT DOCUMENTS 2,787,301 A  *  4/1957  Anderson ............... B27B 25/10
                                                83/435.14
4,599,927 A     7/1986  Eccardt et al.
(Continued)

FOREIGN PATENT DOCUMENTS

AU    2005204290    3/2006
CN       1960828    5/2007
(Continued)

*Primary Examiner* — Liang Dong
(74) *Attorney, Agent, or Firm* — Kathy Takeguchi

(57) ABSTRACT

A power tool apparatus includes at least a power tool, a table, a bevel adjustment assembly, and a bevel stop. The table includes a work surface and a panel portion. The panel portion has an exterior surface. The bevel adjustment assembly is configured to move to various positions along a pathway of the panel portion. The tool is configured to move to various bevel angles as the bevel adjustment assembly moves to the various positions. The bevel stop is disposed on the exterior surface. The bevel stop includes a stopper that is configured to move to a blocking position in which the stopper obstructs a first section of the pathway to stop the bevel adjustment assembly from moving beyond a first position of the pathway along a first direction such that the saw blade is bounded at a first bevel angle corresponding to the first position. The stopper is configured to move to an unblocking position in which the stopper does not obstruct the first section of the pathway such that the bevel adjustment assembly is permitted to move to a second position that is further along the pathway in the first direction than the first position such that the saw blade is not bounded at the first bevel angle and permitted to move to a second bevel angle corresponding to the second position.

16 Claims, 12 Drawing Sheets

(56) References Cited

U.S. PATENT DOCUMENTS

| | | |
|---|---|---|
| 4,909,111 A | 3/1990 | Noble |
| 5,121,554 A * | 6/1992 | Havins .................. B27B 27/06 30/376 |
| 5,623,860 A | 4/1997 | Schoene et al. |
| 5,862,734 A | 1/1999 | Brunson et al. |
| 6,032,562 A | 3/2000 | Brunson et al. |
| 6,032,563 A | 3/2000 | Stumpf et al. |
| 6,067,885 A | 5/2000 | Brunson et al. |
| 6,530,303 B1 | 3/2003 | Parks et al. |
| 6,615,701 B2 | 9/2003 | Hollinger et al. |
| 6,820,524 B1 * | 11/2004 | Ceroll .................. B27B 5/243 83/477.1 |
| 7,252,027 B2 | 8/2007 | Meredith et al. |
| 7,395,745 B2 | 7/2008 | Gehret et al. |
| 8,176,823 B2 | 5/2012 | Lawlor |
| 8,176,824 B2 | 5/2012 | Lawlor |
| 2005/0160895 A1 | 7/2005 | Garcia et al. |
| 2006/0048617 A1 * | 3/2006 | Gehret .................. B27B 5/29 83/473 |
| 2010/0005939 A1 | 1/2010 | Burke et al. |
| 2017/0312837 A1 | 11/2017 | Gass et al. |
| 2021/0060671 A1 | 3/2021 | Oberheim |

FOREIGN PATENT DOCUMENTS

| | | |
|---|---|---|
| CN | 100346914 | 11/2007 |
| CN | 10949149 B | 12/2018 |
| EP | 0715934 | 6/1996 |
| EP | 1060851 | 12/2000 |
| EP | 1834742 | 9/2007 |
| EP | 2022585 | 9/2010 |
| EP | 1767298 | 4/2013 |
| GB | 2295987 | 6/1996 |
| TW | 201116387 | 5/2011 |

* cited by examiner

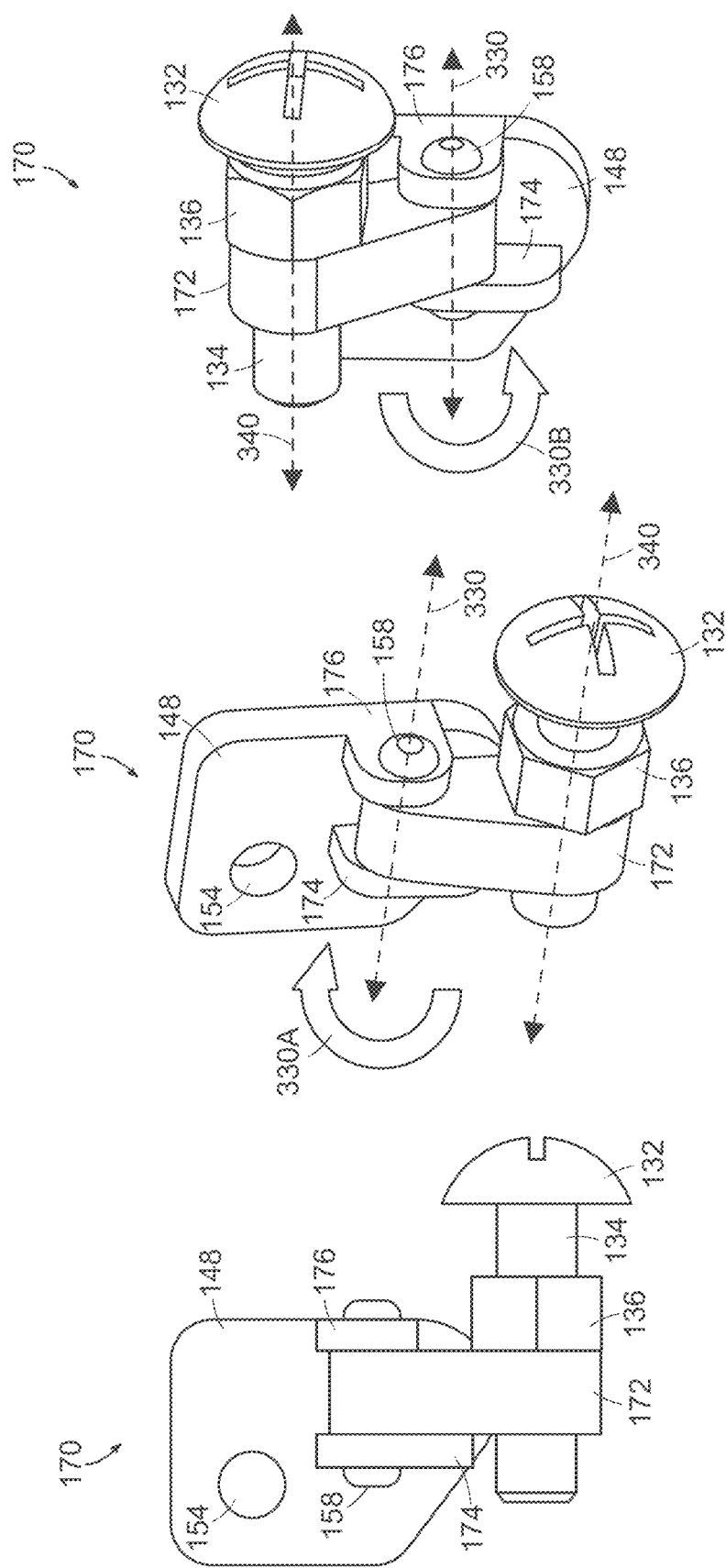

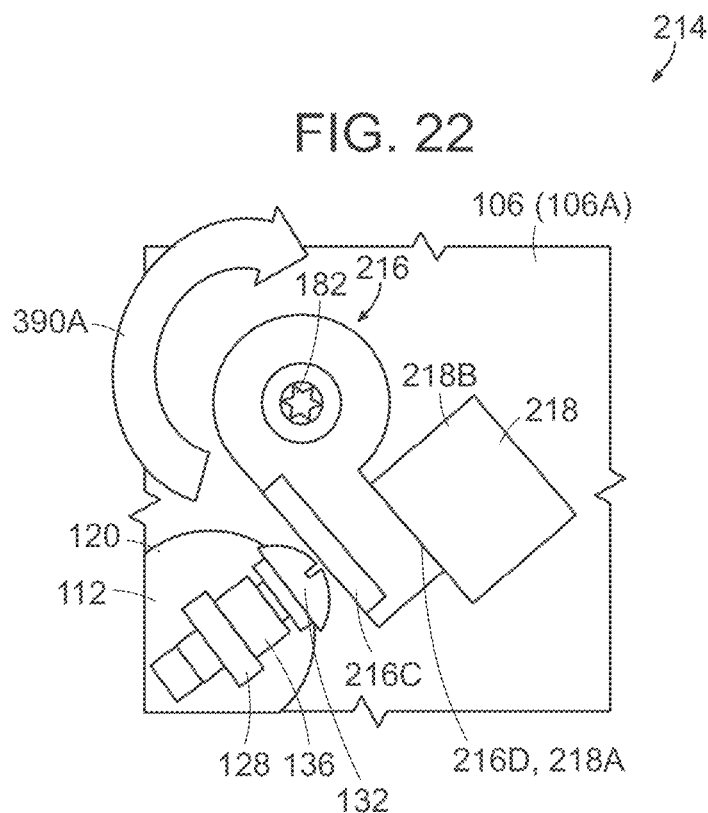
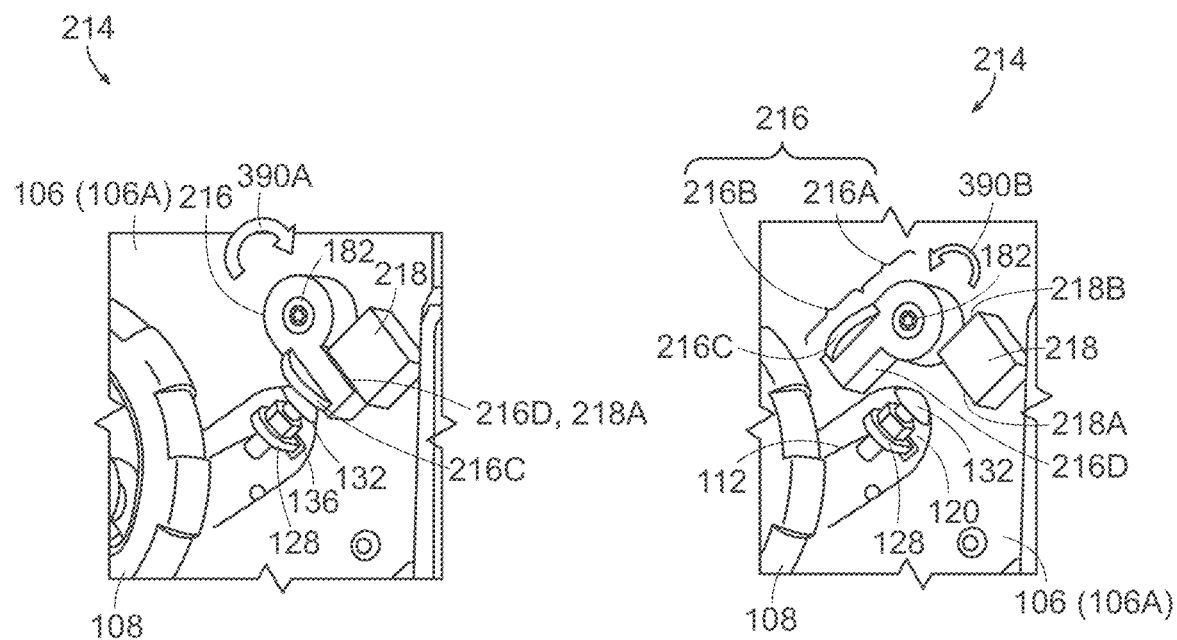

ADJUSTABLE BEVEL ANGLE STOPS WITH QUICK RELEASE AND OVER-RIDE FEATURES

FIELD

This disclosure relates generally to stop assemblies.

BACKGROUND

In general, there are some table saws that include bevel stops for 0 degrees and 45 degrees. The bevel stops are positioned so that a saw blade can make bevel cuts within a predetermined range of 0 degrees to 45 degrees while preventing the saw blade from being positioned at bevel angles that are beyond this predetermined range. However, in the event that a user wants to make a bevel cut at an angle that is beyond this predetermined range, then the user needs to readjust the bevel stops from behind the front plate to enable the saw blade to move beyond the predetermined range. In general, the table saw has to be placed on its side or upside down so that a user is able to adjust these bevel stops to allow for bevel angles beyond the predetermined range. The adjustment of these bevel stops is inconvenient, cumbersome, and time consuming.

SUMMARY

The following is a summary of certain embodiments described in detail below. The described aspects are presented merely to provide the reader with a brief summary of these certain embodiments and the description of these aspects is not intended to limit the scope of this disclosure. Indeed, this disclosure may encompass a variety of aspects that may not be explicitly set forth below.

According to at least one aspect, a power tool apparatus includes at least a power tool assembly, a support assembly, a bevel adjustment assembly, and a first bevel stop. The power tool assembly includes a tool and an actuator. The actuator is configured to actuate the tool. The support assembly is configured to support the power tool assembly. The support assembly includes at least a panel portion. The panel portion includes at least an exterior surface. The bevel adjustment assembly is configured to move along a pathway of the panel portion to at least a first position and a second position. The first position corresponds to a first bevel angle. The second position corresponds to a second bevel angle. The bevel adjustment assembly includes a first flange that protrudes outward from the exterior surface of the panel portion. The first bevel stop is mounted to the exterior surface of the panel portion. The first bevel stop includes a first stopper. The first stopper is movable into a first blocking position in which the first stopper confronts the first flange and prevents the bevel adjustment assembly from moving beyond the first position along a first direction so that the power tool is bounded at a first bevel angle. In addition, the first stopper is movable into a first unblocking position in which the bevel adjustment assembly is permitted to move in the first direction beyond the first position to the second position so that the power tool is not bounded at the first bevel angle and permitted to be positioned at a second bevel angle. The bevel adjustment assembly is configured to move away from the first bevel stop in a second direction when the first bevel stop is in the first blocking position. In addition, the bevel adjustment assembly is configured to move away from the first bevel stop in the second direction when the first bevel stop is in the first unblocking position.

According to at least one aspect, a saw apparatus includes at least a saw blade, a motor, an undercarriage, a bevel adjustment assembly, a support assembly, and a first bevel stop. The motor is configured to drive the saw blade. The undercarriage is configured to support the motor. The bevel adjustment assembly is configured to move the saw blade to various bevel angles. The bevel adjustment assembly includes a bracket. The support assembly is configured to support the saw blade and the undercarriage with the motor. The support assembly includes a panel portion. The panel portion includes an opening defined by sidewall portions that enable the bracket to move along a pathway as the bevel adjustment assembly moves relative to the panel portion. The panel portion includes an exterior surface. The first bevel stop is mounted to the exterior surface of the panel portion. The first bevel stop includes a first stopper that is configured to move into a first blocking position in which the first stopper obstructs the pathway and prevents the bracket from moving beyond a first position along the pathway in a first direction such that the saw blade is bounded at a first bevel angle. The first stopper is also configured to move into a first unblocking position in which the first stopper does not obstruct the pathway such that the bracket is permitted to move along the pathway to a second position that is beyond the first position in the first direction so that the saw blade is configured to be at a second bevel angle. The bracket is configured to move away from the first bevel stop in a second direction when the first bevel stop is in the first blocking position. The bracket is configured to move away from the first bevel stop in the second direction when the first bevel stop is in the first unblocking position.

According to at least one aspect, a saw apparatus includes at least a saw blade, a table, a bevel adjustment assembly, and a bevel stop assembly. The table includes a work surface and a panel portion. The panel portion includes an exterior surface. The bevel adjustment assembly is configured to adjust the saw blade to various bevel angles as the bevel adjustment assembly moves to various positions along a pathway of the panel portion. The bevel stop assembly includes at least a first bevel stop that is disposed on the exterior surface. The first bevel stop includes a first stopper that is configured to move to a first blocking position in which the first stopper obstructs a first section of the pathway to stop the bevel adjustment assembly from moving beyond a first position of the pathway along a first direction such that the saw blade is bounded at a first bevel angle corresponding to the first position. The first stopper is also configured to move to a first unblocking position in which the first stopper does not obstruct the first section of the pathway such that the bevel adjustment assembly is permitted to move to a second position that is further along the pathway in the first direction than the first position such that the saw blade is not bounded at the first bevel angle and permitted to move to a second bevel angle corresponding to the second position.

These and other features, aspects, and advantages of the present invention are discussed in the following detailed description in accordance with the accompanying drawings throughout which like characters represent similar or like parts.

BRIEF DESCRIPTION OF THE DRAWINGS

FIG. 11 is a front view of a first bevel stop of a second example of a bevel stop assembly according to an example embodiment of this disclosure.

FIG. 12 is a perspective view of the first bevel stop of FIG. 11 when this first bevel stop is in a blocking position according to an example embodiment of this disclosure.

FIG. 13 is a perspective view of the first bevel stop of FIG. 11 when this first bevel stop is in an unblocking position according to an example embodiment of this disclosure.

FIG. 22 is a front view of a second bevel stop of a sixth example of a bevel stop assembly with respect to the second end portion of the bevel adjustment assembly when this second bevel stop is in the blocking position according to an example embodiment of this disclosure.

FIG. 23 is a perspective view of the second bevel stop of FIG. 22 with respect to the second end portion of the bevel adjustment assembly when this second bevel stop is in the blocking position according to an example embodiment of this disclosure.

FIG. 24 is a perspective view of the second bevel stop of FIG. 22 with respect to the second end portion of the bevel adjustment assembly when this second bevel stop is in the unblocking position according to an example embodiment of this disclosure.

DETAILED DESCRIPTION

The embodiments described herein, which have been shown and described by way of example, and many of their advantages will be understood by the foregoing description, and it will be apparent that various changes can be made in the form, construction, and arrangement of the components without departing from the disclosed subject matter or without sacrificing one or more of its advantages. Indeed, the described forms of these embodiments are merely explanatory. These embodiments are susceptible to various modifications and alternative forms, and the following claims are intended to encompass and include such changes and not be limited to the particular forms disclosed, but rather to cover all modifications, equivalents, and alternatives falling with the spirit and scope of this disclosure.

Figure 1:
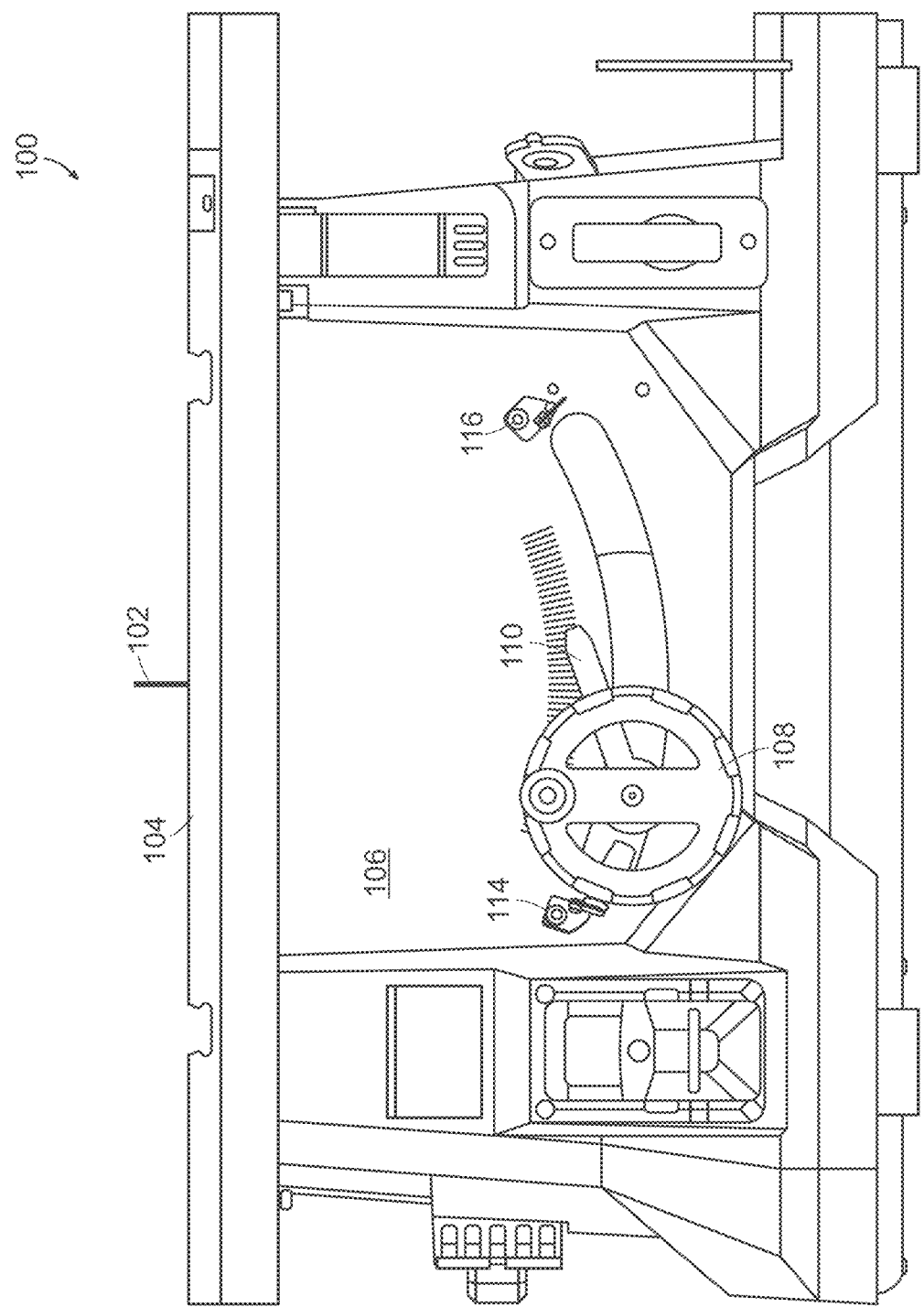
FIG. 1 is a view of a front side of a table saw that includes a first example of a bevel stop assembly according to an example embodiment of this disclosure.

FIG. 1 is a front view of a power tool apparatus with a bevel stop assembly having quick-release and over-ride features according to an example embodiment. The power tool apparatus includes at least a power tool assembly, a support assembly, a bevel adjustment assembly, and a bevel stop assembly. The power tool assembly includes a power tool. The support assembly includes at least a structure to support the power tool assembly. The bevel adjustment assembly is configured to adjust a bevel angle of the power tool. The bevel stop assembly includes at least a first bevel stop and a second bevel stop. In addition, the power tool apparatus may include a number of other assemblies and/or other components, which are not discussed herein.

Figure 3:
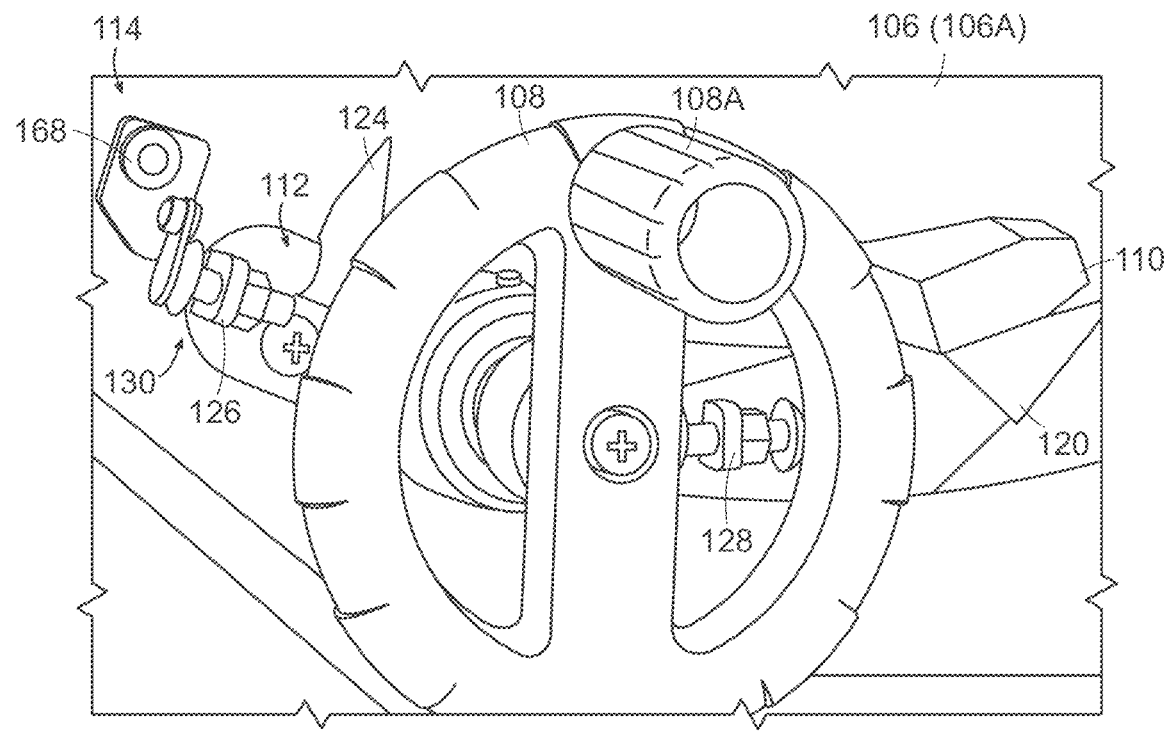
FIG. 3 is a perspective view of a section of FIG. 2 according to an example embodiment of this disclosure.

More specifically, referring to FIG. 1, as an example, the power tool apparatus is a table saw 100, which includes at least a saw assembly, a support assembly, and a bevel assembly. The saw assembly includes at least a saw blade 102. The saw assembly may also include a number of other components. The support assembly is configured to support at least the saw assembly, as well as other components that are not shown in FIG. 1. For example, these other components include an actuator (e.g. a motor), an undercarriage, a drive shaft, trunnions, any suitable component, or any combination thereof. The support assembly includes at least a table with a work surface 104. In this case, the upper surface of the table is the work surface 104. The support assembly also includes at least one side portion, which includes at least one side plate or panel. For example, in FIG. 1, the front side portion includes a front plate 106. The bevel adjustment assembly includes a number of components to move the saw blade 102 to various positions (e.g. various heights and various bevel angles). For instance, in FIG. 1, the bevel adjustment assembly includes at least a wheel 108, a bevel lock assembly (e.g., lever 110), and a bracket 112 (FIG. 3). The bevel adjustment assembly may also include other components, which relate to adjusting a position of the saw blade 102. The bevel stop assembly includes at least a first bevel stop 114 and a second bevel stop 116.

Figure 2:
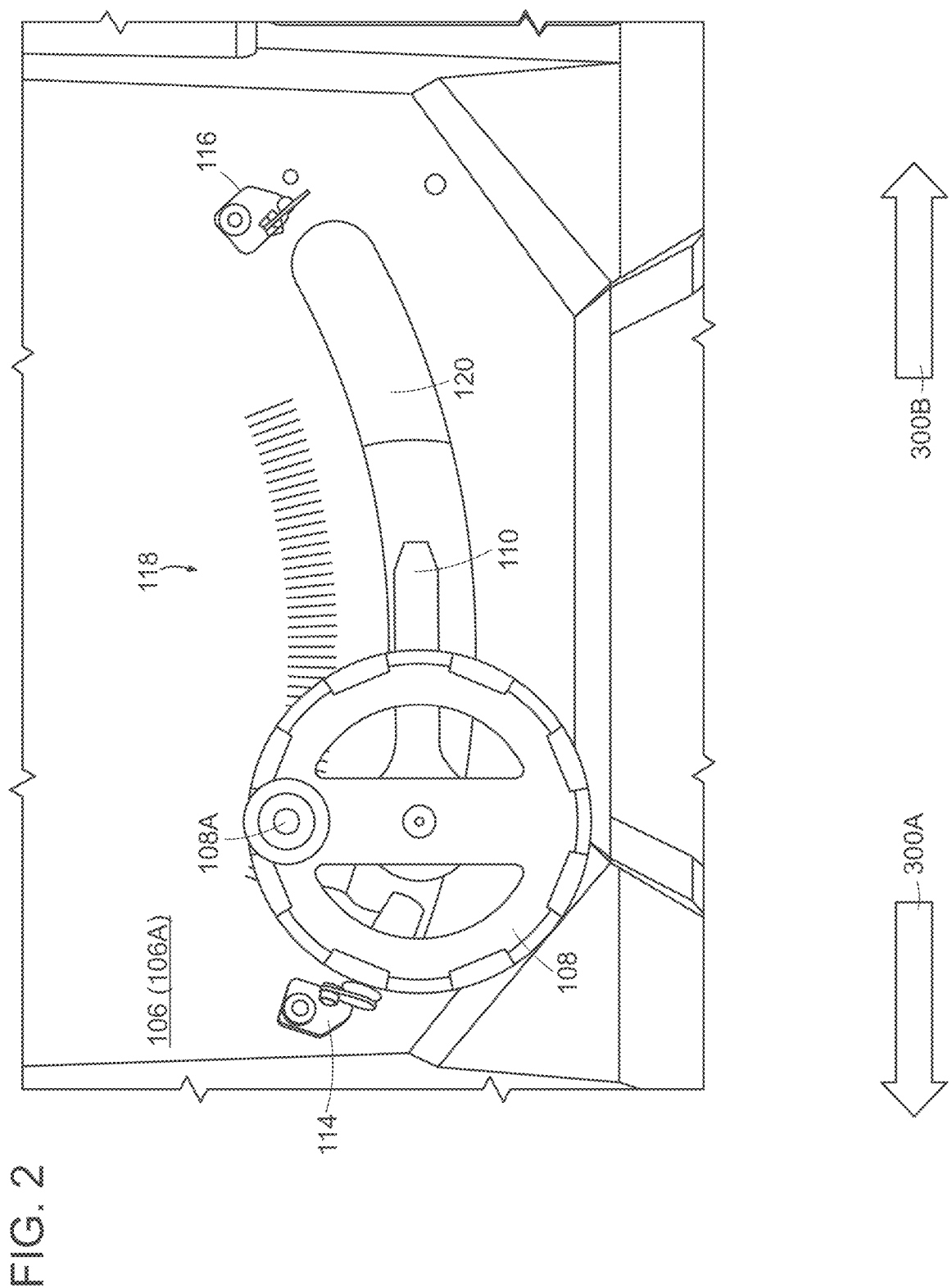
FIG. 2 is a view of the bevel stop assembly of FIG. 1 according to an example embodiment of this disclosure.

FIGS. 2-3 show views of the bevel adjustment assembly and the bevel stop assembly with respect to a side panel according to an example embodiment. In this example, the side panel is a front plate 106 of the support assembly. The front plate 106 includes a front surface 106A that provides an exterior surface of the support assembly and a rear surface 106B (FIGS. 18-21) that provides an interior surface of the support assembly. The front plate 106 is configured to include a bevel angle scale 118, which is provided on the front surface 106A. In this example, the bevel angle scale 118 includes various measurements that include a first bevel angle (e.g., 0 degrees) and a second bevel angle (e.g., 45 degrees), as well as various bevel angles between the first bevel angle and the second bevel angle. Also, the bevel angle scale 118 is also configured to include other measurements, such as bevel angles that are less than 0 degrees and bevel angles that are greater than 45 degrees for instances in which the bevel stop assembly is in the over-ride state in which the first bevel stop 114 and/or the second bevel stop 116 is in the unblocking position.

The wheel 108 is accessible from a front side of the front plate 106. The wheel 108 and the bevel lock assembly are movable relative to the front plate 106. For example, in FIG. 1, the wheel 108 is a hand-wheel, which allows a user to handle and move the saw blade 102 upward or downward with ease to adjust a height of the saw blade 102 with respect to the work surface 104. Also, as shown in at least FIGS. 2-3, the wheel 108 includes a handle portion 108A for the user to grasp when handling the wheel 108. The wheel 108 is rotatable in one direction to adjust a height of the saw blade in an upward direction and rotatable in an opposite direction to adjust a height of the saw blade in a downward direction.

The wheel 108 is also configured to swing or move within the opening 120 of the front plate 106 in a first direction 300A to move the bevel adjustment assembly in a first direction 300A along the front plate 106. When the bevel adjustment assembly moves in the first direction 300A, then the bevel adjustment assembly moves the saw blade 102 from the current bevel angle to another bevel angle, which is less than the current bevel angle. In addition, the wheel 10g is configured to swing or move within the opening 120 of the front plate 106 in an opposite direction to move the bevel adjustment assembly in a second direction 300B along the front plate 106. When the bevel adjustment assembly moves in the second direction 300B, then the bevel adjustment assembly moves the saw blade 102 from the current bevel angle to another bevel angle, which is greater than the current bevel angle. In this regard, for example, the wheel 108 (and/or bevel lock assembly) enables a user to move the bevel adjustment assembly along a pathway of the front plate 106 while the bevel adjustment assembly is being guided, for instance, by trunnions of the undercarriage such that the bevel angle of the saw blade 102 can be adjusted.

In addition, the bevel lock assembly is accessible from a front side of the front panel 106. The bevel lock assembly is configured to secure and maintain the saw blade 102 at its current bevel angle when in the locked state and enable the saw blade 102 to move to various bevel angles when in the unlocked state. For example, as shown in at least FIGS. 2-3, the bevel lock assembly includes a lever 110, which is configured to move into a locking position to provide the locked state and an unlocking position to provide the unlocked state with respect to the saw blade 102. In this case, the lever 110 is configured to rotate about a center axis of the wheel 108 in one direction to provide the unlocked state and an opposite direction to provide the locked state.

Figure 4:
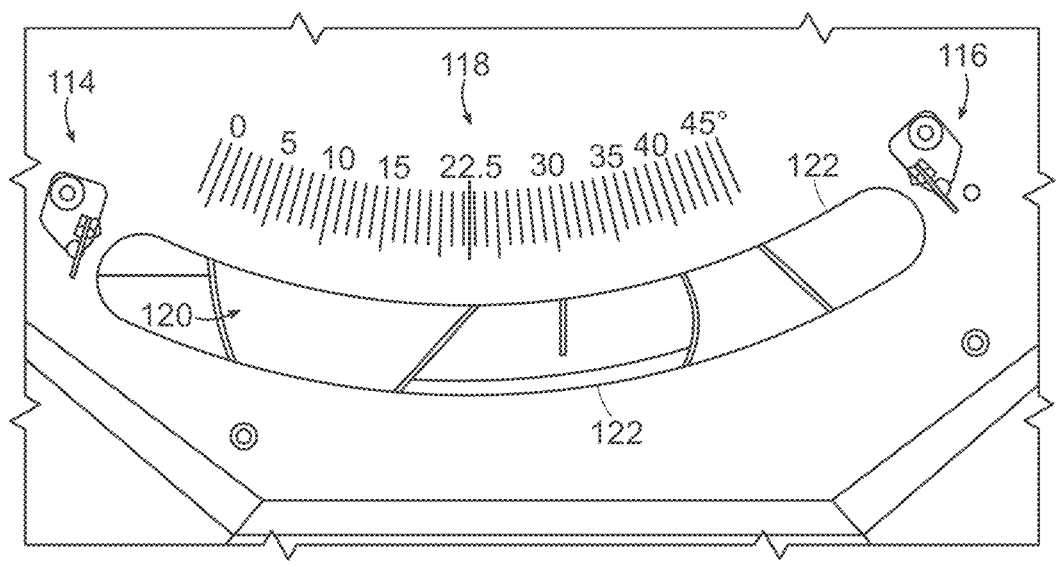
FIG. 4 is a front view of the bevel stop assembly of FIG. 2 with respect to the front plate according to an example embodiment of this disclosure.

FIG. 4 shows an enlarged view of the bevel stop assembly with respect to the front plate 106. The bevel stop assembly is mounted to the front surface 106A of the front plate 106, thereby enabling a user to easily access and adjust the bevel stop assembly. As shown in FIG. 4, the bevel stop assembly includes a first bevel stop 114 and a second bevel stop 116, which are disposed near and/or adjacent to opposite end portions of an opening 120 of the front plate 106. In this regard, the front plate 106 includes sidewall portions 122 that define the opening 120, which is a through-hole that extends from the front surface 106A to the rear surface 106B. The sidewall portions 122 include curvature and/or curved portions. For example, as shown in FIG. 4, the sidewall portions 122 have an arcuate shape in cross-sectional view. The sidewall portions 122 and the opening 120 are structured to provide a pathway that permit and enable the wheel 108 to move to various positions that correspond to the various bevel angles. As shown in at least FIGS. 1 and 2, the wheel 108 and the lever 110 are disposed on the front side of the front plate 106 so that the user may access and operate the wheel 108 and the lever 110 with ease to adjust a height and a bevel angle of the saw blade 102. In this regard, the opening 120 provides a passageway that enables the wheel 108 and the lever 110, which are provided on the front side of the front plate 106, to be connected with other components that are provided on the rear side of the front plate 106.

In addition, the front plate 106 is configured to receive a support member via the opening 120. The support member is configured to move within the opening 120 and along the front plate 106. For example, in FIG. 3, the support member includes the bracket 112 that supports the wheel 108, the lever 110, and a bevel angle pointer 124 in relation to other components 146 (FIG. 6) of the table saw 100. In this case, the bracket 112 is configured to support the wheel 108 as the wheel 108 moves to various positions along the front plate 106. The bracket 112 is configured to support the bevel lock assembly, which includes the lever 110 that is configured to provide the locked state and unlocked state with respect to the current position of the saw blade 102. In addition, the bracket 112 is configured to support the bevel angle pointer 124, which points to a measurement on the bevel angle scale 118 to indicate a current bevel angle of the saw blade 102. In this example, the support member is distinct and separate from the undercarriage (not shown) of the table saw 100. In another example, the support member is a part of the undercarriage. In general, the support member may be any suitable stricture or mechanism that is configured to provide the functionalities of the bracket 112, as described herein.

In an example embodiment, the bracket 112 includes a first end portion and a second end portion. The first end portion includes a first flange 126 (FIG. 3) that protrudes outward from the bracket 112. The first flange 126 is configured to extend perpendicular (or substantially perpendicular) to the middle portion of the bracket 112. The first flange 126 is also configured to extend perpendicular (or substantially perpendicular) to the front surface 106A. The first flange 126 is configured to extend through the opening 120. The first flange 126 is structured and sized to confront and abut against the first bevel stop 114 when the first bevel stop 114 is in the blocking position. The first flange 126 is spaced from the lever 110 to enable the lever 110 to rotate.

Meanwhile, the second end portion includes a second flange 128 (FIG. 3) that protrudes outward from the bracket 112. The second flange 128 is configured to extend perpendicular (or substantially perpendicular) to the middle portion of the bracket 112. The second flange 128 is also configured to extend perpendicular (or substantially perpendicular) to the front surface 106A. The second flange 128 is configured to extend through the opening 120. The second flange 128 is spaced from the lever 110 to enable the lever 110 to rotate. The second flange 128 is structured and sized to confront and abut against the second bevel stop 116 when the second bevel stop 116 is in the blocking position.

Figure 5:
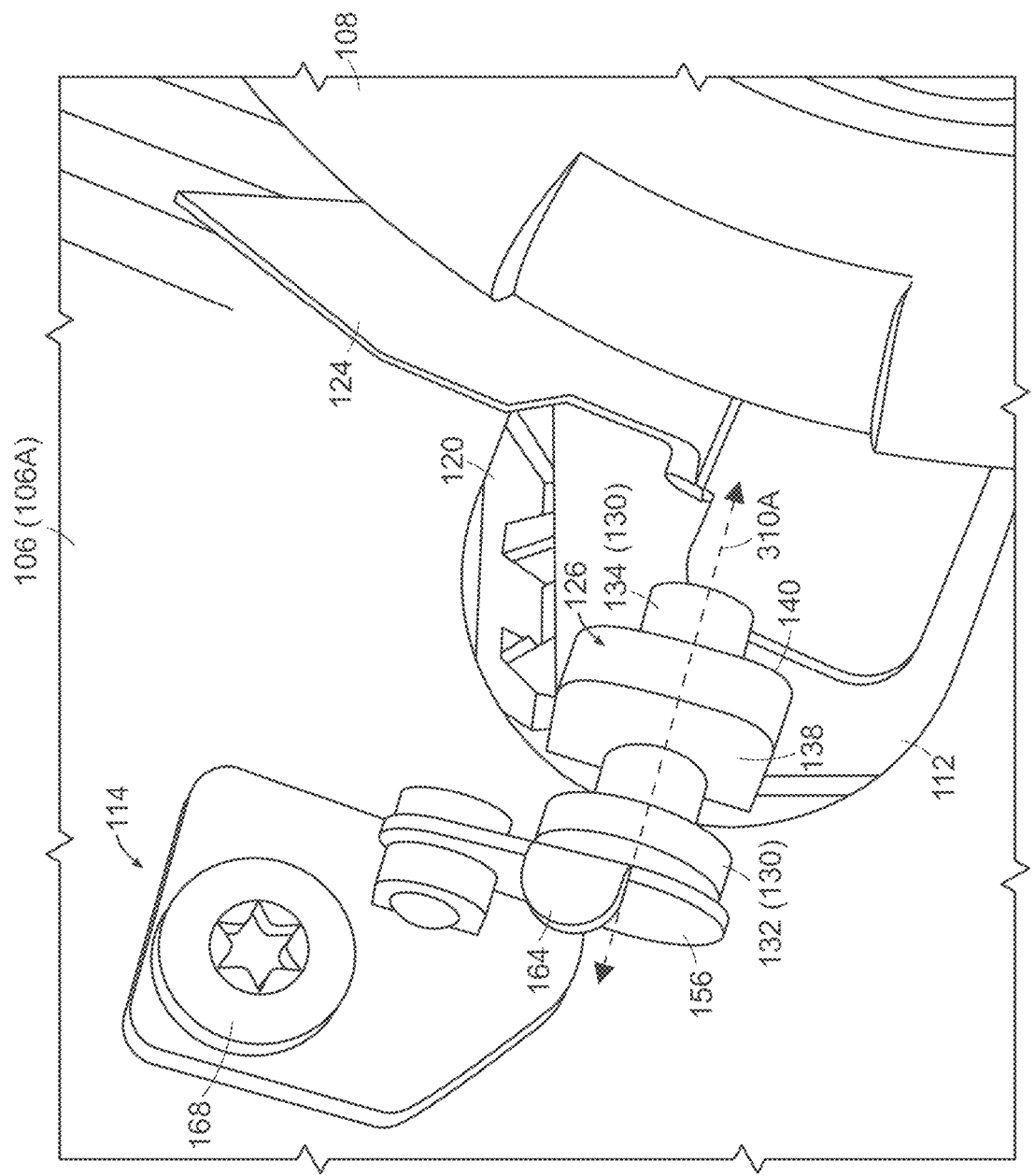
FIG. 5 is a view of the first bevel stop of FIG. 2 with respect to a first end portion of the bevel adjustment assembly according to an example embodiment of this disclosure.
Figure 6:
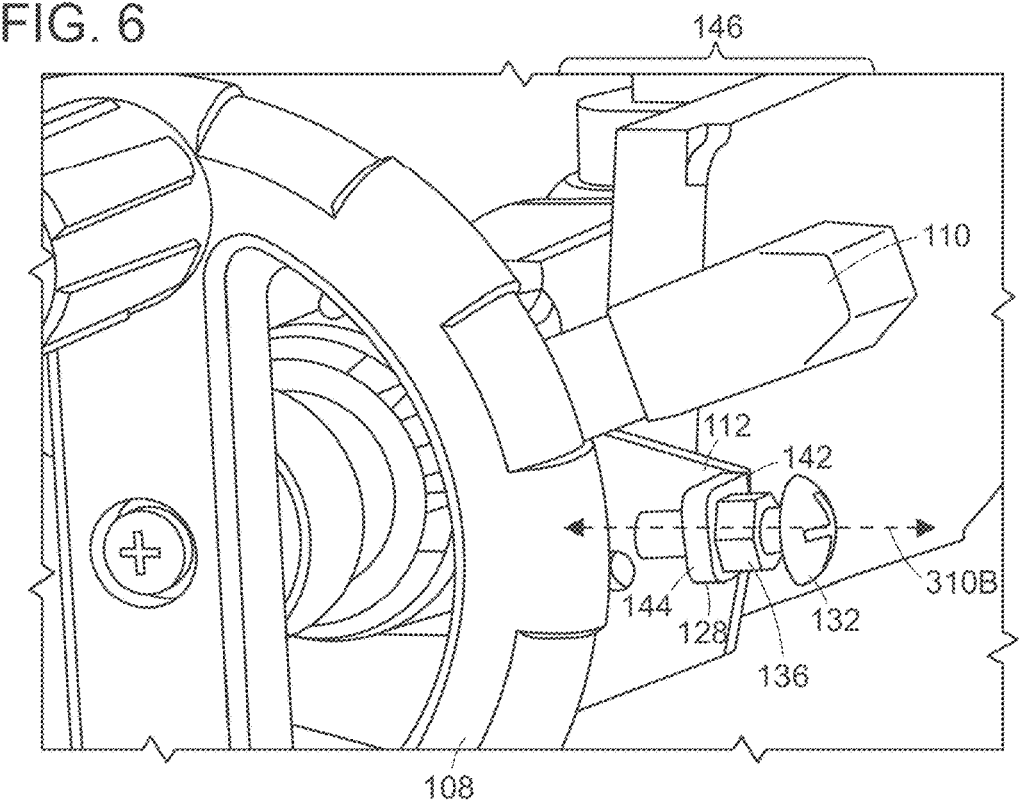
FIG. 6 is a perspective view of a second end portion of the bevel adjustment assembly of FIG. 5 according to an example embodiment of this disclosure.

FIG. 5 illustrates a view of the first flange 126 with respect to the first bevel stop 114 according to an example embodiment. In FIG. 5, the first flange 126 includes a first through-hole. The first through-hole is configured to receive an adjusting screw 130 such that the adjusting screw 130 extends along an axis 310A, which is perpendicular (or substantially perpendicular) to a surface of the first flange 126. The adjusting screw 130 is configured to be parallel (or substantially parallel) to the plane of the front surface 106A. The first flange 126 is configured to support the adjusting screw 130 and enable the adjusting screw 130 to move along the axis 310A. The adjusting screw 130 is advantageous in enabling fine adjustments to be made in accordance with its length and extension amount from a surface of the first flange 126. The adjusting screw 130 includes at least a head 132 and a shaft 134. The adjusting screw 130 is configured to be secured to the first flange 126 via a nut 136 (FIG. 6). The adjusting screw 130 is positioned such that the head 132 is on an outer side 138 of the first flange 126 and the shaft 134 is on an inner side 140 of the first flange 126. In this regard, the adjusting screw 130 is positioned such that its head 132 is configured to abut against the first bevel stop 114 when the bracket 112 is located at the first position along the pathway and the first bevel stop 114 is oriented in the blocking position.

Figure 7:
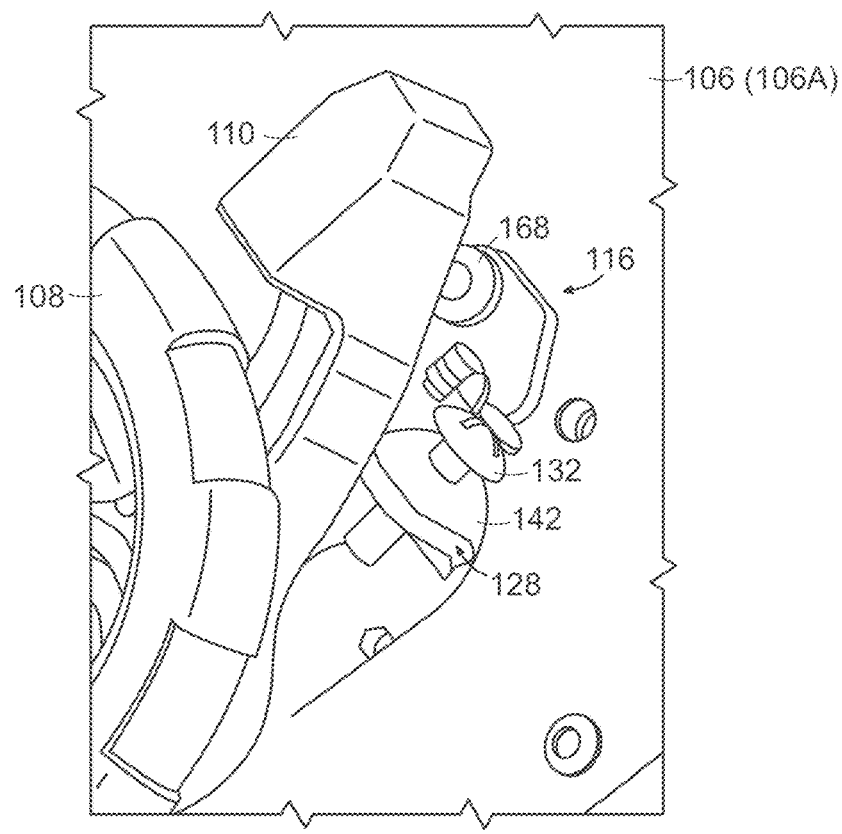
FIG. 7 is a view of the second bevel stop of FIG. 2 with respect to the second end portion of the bevel adjustment assembly according to an example embodiment of this disclosure.

FIGS. 6-7 illustrates different views of the second flange 128 according to an example embodiment. More specifically, FIG. 6 shows a perspective view of the second flange 128. FIG. 7 shows the second flange 128 with respect to the second bevel stop 116. In FIGS. 6-7, the second flange 128 includes a second through-hole. The second through-hole is configured to receive an adjusting screw 130 such that the adjusting screw 130 extends along the axis 310B. The second flange 128 is configured to support the adjusting screw 130 at a position that enables the head 132 of the adjusting screw 130 to abut against the second stopper when the second bevel stop 116 is in the blocking position. The adjusting screw 130 is advantageous in enabling fine adjustments to be made in accordance with its length and extension amount from a surface of the second flange 128. The adjusting screw 130 is positioned within the second flange 128 such that the head 132 of the adjusting screw 130 faces away from the wheel 108. The adjusting screw 130 is positioned such that the head 132 is on an outer side 142 of the second flange 128 and the shaft 134 is on an inner side 144 of the second flange 128. The adjusting screw 130 is positioned such that its head 132 is configured to abut against the second bevel stop 116 when the bracket 112 is located at the second position along the pathway and the second bevel stop 116 is oriented in a blocking position.

Figure 8:
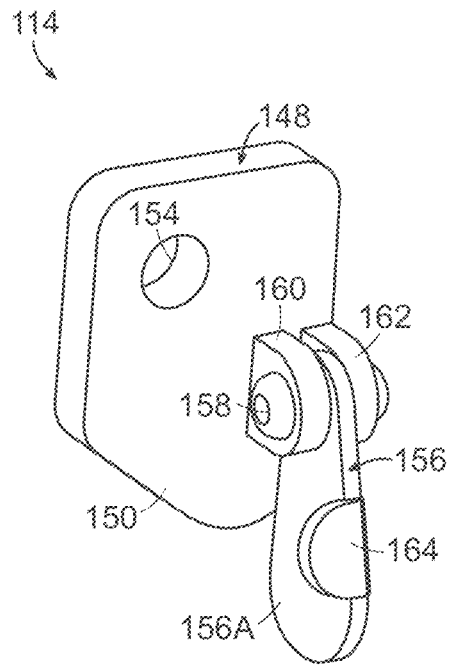
FIG. 8 is a perspective view of a front side of the first bevel stop of FIG. 2 according to an example embodiment of this disclosure.
Figure 9:
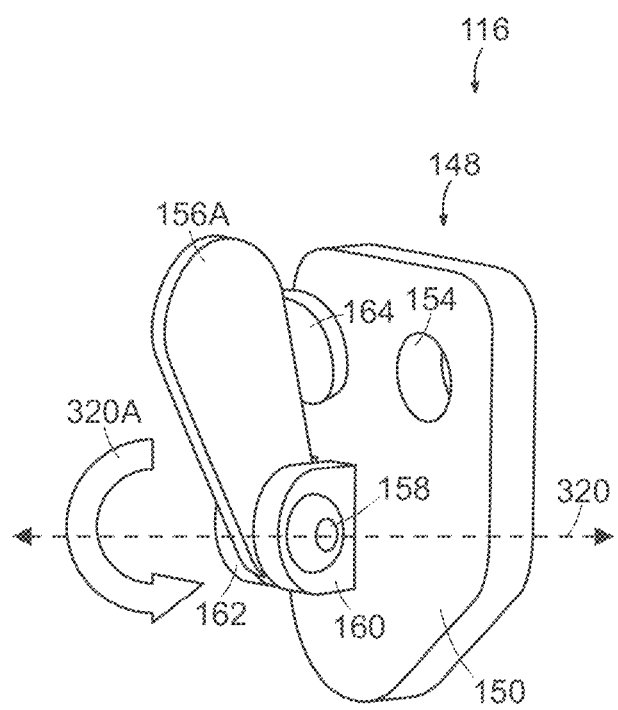
FIG. 9 is a perspective view of a front side of the second bevel stop of FIG. 2 according to an example embodiment of this disclosure.

FIGS. 8-9 illustrate perspective views of front sides of the first bevel stop 114 and the second bevel stop 116, respectively. As shown in FIGS. 8-9, the first bevel stop 114 and the second bevel stop 116 include similar features that are configured for use on the left side of the bevel adjustment assembly and the right side of the bevel adjustment assembly, respectively, when taken from a front view. In this case, the left side corresponds to the lesser bevel angles and the right side corresponds to the greater bevel angles. For example, each of the first bevel stop 114 and the second bevel stop 116 include a mounting portion and a stopper portion. The mounting portion includes a mounting plate 148 with a front surface 150 and a rear surface 152. In this example, the front surface 150 and the rear surface 152 are flat. The mounting plate 148 includes a through-hole 154, which is configured to receive a fastener 168 (FIG. 5) that secures the first bevel stop 114 to the front plate 106. The through-hole 154 is located at an upper corner portion of the mounting plate 148 so that the fastener 168 is positioned to secure the first bevel stop 114 to the front plate 106, while also being in a non-interfering position with the stopper portion. In this regard, the first bevel stop 114 includes the through-hole on the outer side (or left side when facing the first bevel stop 114) of the mounting portion so that the fastener 168 is in a secure, non-interfering position when the stopper is engaged in the blocking position and the unblocking position.

Figure 10:
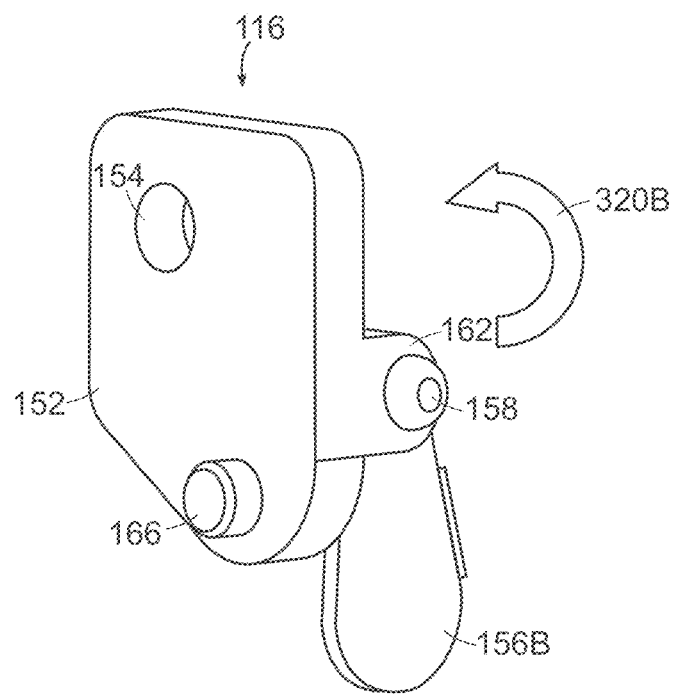
FIG. 10 is a perspective view of a rear side of the second bevel stop of FIG. 9 according to an example embodiment of this disclosure.

Similarly, as shown in FIGS. 9 and 10, the second bevel stop 116 includes the mounting plate 148 with the through-hole 154, which is configured to receive a fastener 168 (FIG. 7) that secures the second bevel stop 116 to the front plate 106. The mounting plate 148 includes the through-hole 154 at an upper corner portion of the mounting plate 148 so that the fastener 168 is positioned to secure the second bevel stop 116 to the front plate 106, while also being in a non-interfering position with respect to the stopper portion. In this regard, the second bevel stop 116 includes the through-hole 154 on the outer side (e.g., right side when viewed from the front) of an upper corner portion of the mounting portion and the stopper portion on the inner side (e.g., left side when viewed from the front) of a lower corner portion of the mounting portion so that the fastener 168 is in a secure, non-interfering position with respect to the stopper portion. In general, the inner side refers to the side that is closest to the bevel adjustment assembly while the outer side refers to that side that is farthest from the bevel adjustment assembly.

In addition, the first bevel stop 114 provides the stopper portion on the inner side (e.g., right side when viewed from the front) of the mounting portion so that the stopper portion is positioned to interact with the first flange 126. Meanwhile, the second bevel stop 116 provides the stopper portion on the inner side (e.g. left side when viewed from the front) of the mounting portion so that the stopper portion is positioned to interact with the second flange 128. In this regard, the first bevel stop 114 is configured for use on the left side of the bevel adjustment assembly while the second bevel stop 116 is configured for use on the right side of the bevel adjustment assembly with respect to a front view. In each of these cases, the stopper portion includes a stopper 156.

The stopper 156 is an elongated member with a first end portion and a second end portion. In addition, the stopper includes at least a surface 156A that faces away from the bevel adjustment assembly and at least another surface 156B that faces towards the bevel adjustment assembly. In this case, the surface 156A and the another surface 156B are flat, but they may comprise any suitable surface type that provide the functions as described herein. Also, in this example, the first end portion is smaller in size than the second end portion. The first end portion includes a through-hole, which is configured to receive an axle 158. The first end portion of the stopper 156 is positioned between a first tab 160 and a second tab 162, which protrude outward from the front surface 150. There is a predetermined amount of space between the first tab 160 and the second tab 162 to support the first end portion of the stopper 156 and enable the stopper 156 to rotate about the axle 158. The first tab 160 and the second tab 162 include through-holes, which are configured to receive the axle 158.

The axle 158 extends along an axis 320, which is parallel (or substantially parallel) to a plane of the mounting portion. The axle 158 is configured to be parallel (or substantially parallel) to a plane of the front surface 106A of the front plate 106. The axle 158 is configured to extend through the through-hole of the first tab 160, the through-hole of the first end portion of the stopper 156, and the through-hole of the second tab 162. In this regard, the stopper 156 is configured to rotate about the axis 320 of the axle 158 in a first direction 320A to transition from the unblocking position (FIG. 9) to the blocking position (FIG. 10). In addition, the stopper 156 is configured to rotate about the axis 320 in a second direction 320B to transition from the blocking position (FIG. 10) to the unblocking position (FIG. 9).

Meanwhile, the second end portion of the stopper 156 is configured to prevent the bevel adjustment assembly from moving past the stopper 156. More specifically, the surface 156B (or at least a portion thereof) is configured to confront and abut against the head 132 of the adjusting screw 130, as shown in FIGS. 5 and 7, to stop the bevel adjustment assembly from moving past the stopper 156 when the stopper 156 is in the blocking position. Also, in this example, the stopper 156 includes a gripping portion 164, which enables a user to grasp and rotate the stopper 156 from one position (e.g., blocking position) to another position (e.g., unblocking position), and vice versa, with ease. In this non-limiting example, the gripping portion 164 is provided on a side or edge portion of the stopper 156, as shown in at least FIG. 9, such that the gripping portion 164 is easy to access, use, and hold while also being configured to abut against the front surface 150 when in the unblocking position.

FIG. 10 is a perspective view that shows at least a rear side of the second bevel stop 116 of FIG. 9 as an illustrative example. It is respectfully noted that the rear side of the first bevel stop 114 of FIG. 8 is not shown, but is similar to the rear side of the second bevel stop 114 while being configured for use on the opposite side of the bevel adjustment assembly. More specifically, as shown in FIG. 10, the second bevel stop 116 includes the mounting portion. The rear surface 152 is on the rear side of the mounting portion. The rear surface 152 includes a flat surface that is configured to contact the front surface 106A of the front plate 106. As shown in FIG. 10, the rear surface 152 includes the through-hole 154 for the fastener 168, which is configured to extend through a corresponding hole in the front plate 106 and secure the second bevel stop 116 to the front plate 106. Also, in the example shown in FIG. 10, the rear surface 152 includes a boss 166. The boss 166 is configured to mate with a corresponding hole of the front plate 106. The boss 166 is positioned on the mounting portion to serve as an anti-rotation mechanism, as well as a locator for fixing the second bevel stop 116 to the front plate 106. In this case, the boss 166 is located diagonally across from the through-hole 154 so that the boss 166 is configured to provide support below the stopper portion.

FIGS. 11-14 illustrate a second example of the bevel stop assembly according to an example embodiment. This second example of the bevel stop assembly includes a first bevel stop 170 and a second bevel stop (not shown). More specifically, FIGS. 11-13 illustrate a first bevel stop 170 that is configured to be used on the left side (when facing the front surface 106A of the front plate 106). Although not shown, the second bevel stop includes similar features, but is configured for use on the right side (when facing the front surface 106A of the front plate 106). The first bevel stop 170 includes a mounting portion and a stopper portion. As shown in FIGS. 11-14, the mounting portion is similar to the mounting portion of FIG. 8 and includes the mounting plate 148 with the through-hole 154, which is configured to receive a fastener 168 (FIG. 14) that secures the second bevel stop to the front plate 106. Also, in this example, the stopper portion includes an arm 172, a first tab 174, a second tab 176, the axle 158, the adjusting screw 130, and the nut 136.

The arm 172 is an elongated member with a first end portion and a second end portion. In this example, the first end portion is smaller than the second portion. For example, as shown in the perspective views of FIGS. 12-13, the arm 172 is a tapered structure. The first end portion includes a through-hole, which is configured to receive the axle 158. The first end portion of the arm 172 is positioned between the first tab 174 and the second tab 176. In this example, the first tab 174 is larger than the second tab 176. For instance, as shown in FIGS. 11-13, the first tab 174 is on the outer side and configured to support the arm 172 when the bevel adjustment assembly abuts against the adjusting screw 130. The first tab 174 extends further along the arm 172 than the second tab 176 to provide additional support for the arm 172, which may abut against the second tab 176 when the bevel adjustment assembly abuts against the adjusting screw 130. The first tab 174 and the second tab 176 include through-holes, which are configured to receive the axle 158. The axle 158 extends along an axis 330, which is parallel (or substantially parallel) to a plane of the mounting portion. The axle 158 is configured to be parallel (or substantially parallel) to a plane of the front surface 106A of the front plate 106. The axle 158 is configured to extend through the through-hole of the first tab 174, the through-hole of the first end portion of the arm 172, and the through-hole of the second tab 176. In this regard, the arm 172 is configured to rotate about the axis 330 in a first direction 330A and a second direction 330B, respectively.

The arm 172 includes a second end portion. The second end portion is opposite to the first end portion. The second end portion includes a through-hole, which is configured to receive the adjusting screw 130. In this case, the through-hole of the second end portion is larger than the through-hole of the first end portion. The second end portion is configured to hold and support the adjusting screw 130 while enabling an extension amount of the adjusting screw 130 from the surface of the arm 172 to be adjusted along the axis 340. In this example, as shown in FIGS. 11-13, the nut 136 is configured to hold the adjusting screw 130 at the desired position from the surface of the arm 172 to provide the desired extension amount. This feature is advantageous in enabling a user to provide fine adjustments to the position of the stopper portion, thereby adjusting a location of the first position along the pathway and enabling greater precision in positioning the saw blade 102.

Figure 14:
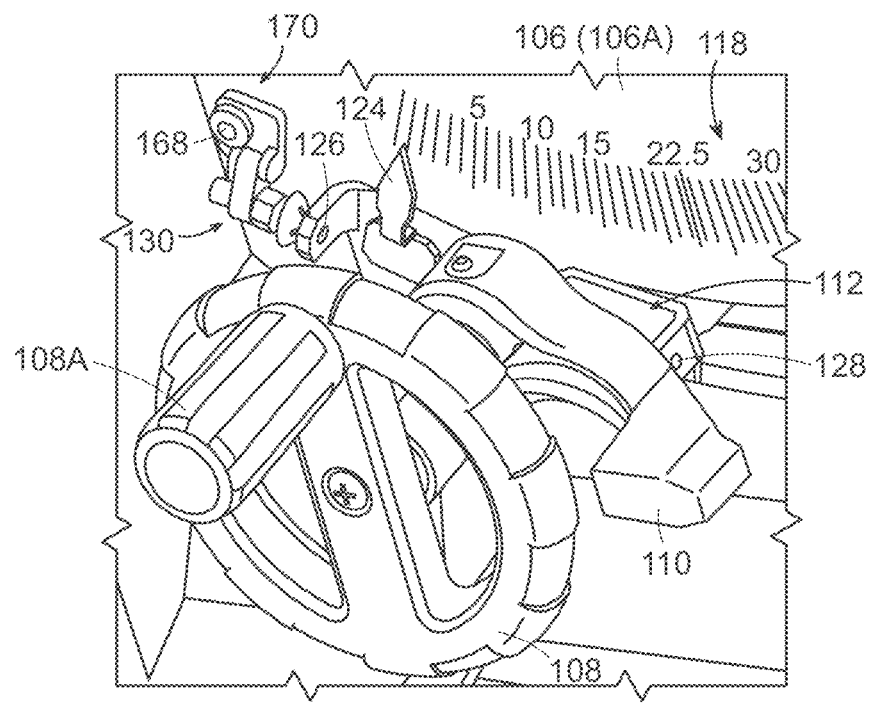
FIG. 14 is a perspective view of the first bevel stop of FIG. 11 with respect to the bevel adjustment assembly when this first bevel stop is in the blocking position according to an example embodiment of this disclosure.

The arm 172 is configured to move about the axle 158 so that the adjusting screw 130 is positioned at a first position ("blocking position"), where the adjusting screw 130 is configured to overlap a corresponding part (e.g., a first section) of the opening 120 and thus obstruct a pathway of the bevel adjustment assembly so that the bevel adjustment assembly stops at a first bevel angle (e.g., zero degrees). For instance, as shown in FIGS. 11-12 and 14, the arm 172 is in the blocking position when the second end portion of the arm 172 and the adjusting screw 130 are positioned below the axle 158. In this regard, as shown in FIG. 14, the adjusting screw 130 is configured to be oriented so that the head 132 of the adjusting screw 130 faces the bevel adjustment assembly. The head 132 provides an abutment surface, which is configured to confront and abut against the first flange 126 to prevent and stop the bevel adjustment assembly from continued movement along the first direction 300A. For example, FIG. 14 shows the first bevel stop 170 in the blocking position with the head 132 abutting against the outer surface of the first flange 126 of the bracket 112.

The arm 172 is configured to move about the axle 158 so that the adjusting screw 130 is positioned at a second position ("unblocking position"), where the adjusting screw 130 does not overlap that corresponding part (e.g. first section) of the opening 120 and clears itself from the pathway of the bevel adjustment assembly so that the bevel adjustment assembly is free to move beyond the first bevel angle (e.g. zero degrees) and provide a current bevel angle that is less than the first bevel angle (e.g. less than zero degrees). For instance, in this example, the arm 172 is in the unblocking position when the second end portion of the arm 172 and the adjusting screw 130 are positioned above the axle 158. More specifically, for example, when the user wants to position the saw blade 102 at a bevel angle that is less than zero degrees, then the user may lift and/or rotate the second end portion of the arm 172 about the axle 158 so that the adjusting screw 130 is out of the way and the bevel adjustment assembly is enabled to continue to move into a position along the front plate 106 that corresponds to a bevel angle that is less than the first bevel angle. When in the unblocking position, the adjusting screw 130 is positioned completely out of the pathway of the bevel adjustment assembly such that no portion of the first bevel stop 170 interferes with a movement of the bevel adjustment assembly along the pathway.

Figure 15:
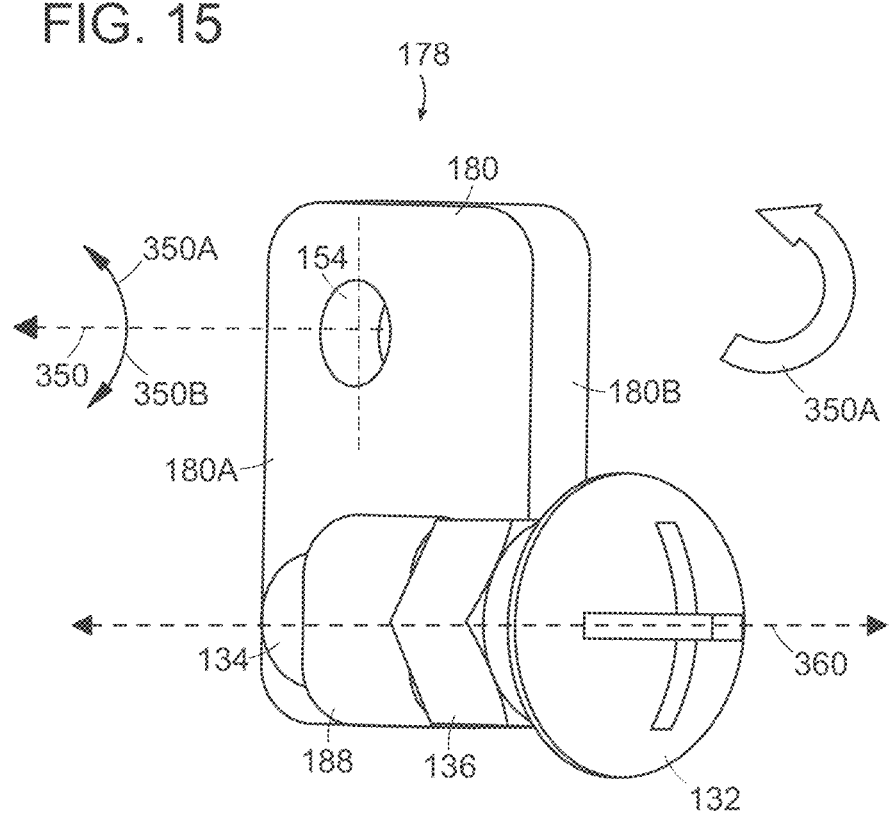
FIG. 15 is a perspective view of a first bevel stop of a third example of a bevel stop assembly according to an example embodiment of this disclosure.
Figure 16:
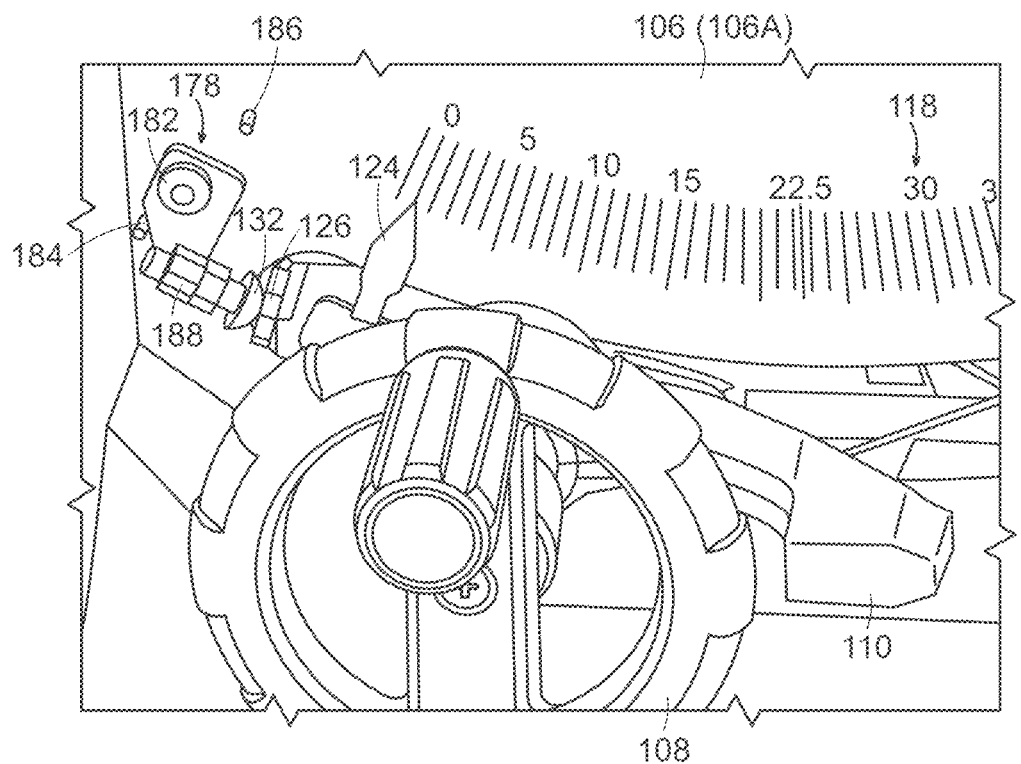
FIG. 16 is a perspective view of the first bevel stop of FIG. 15 with respect to the bevel adjustment assembly when this first bevel stop is in the blocking position according to an example embodiment of this disclosure.
Figure 17:
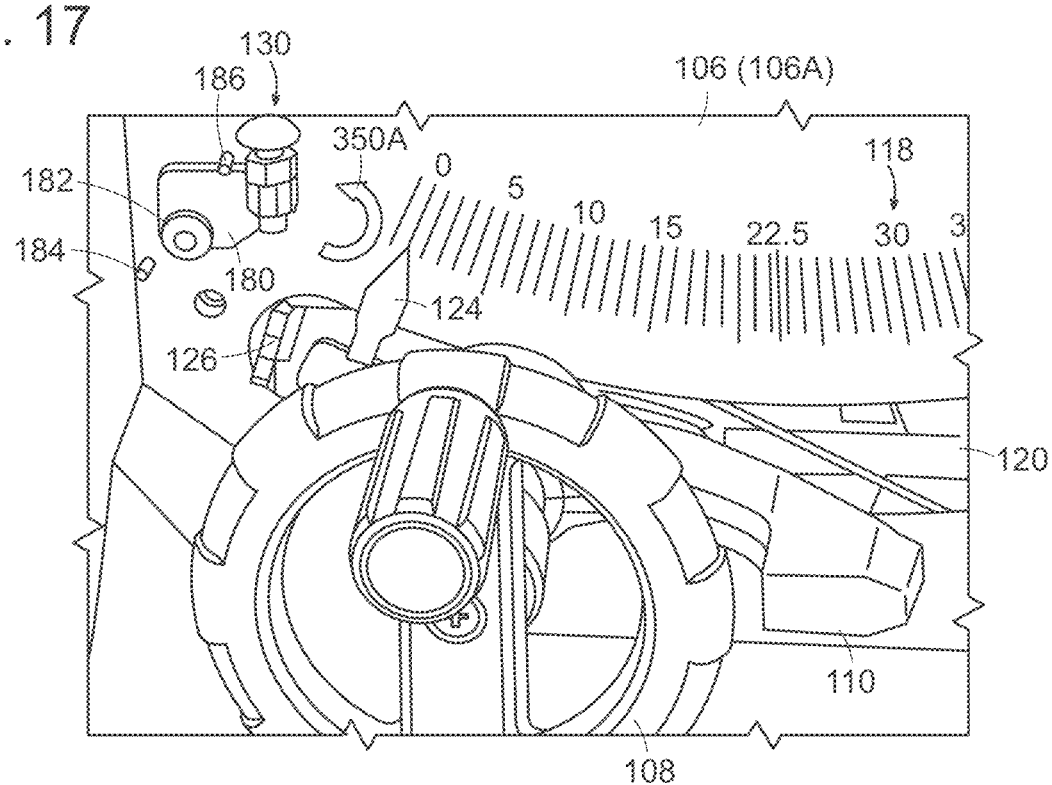
FIG. 17 is a perspective view of the first bevel stop of FIG. 15 with respect to the bevel adjustment assembly when this first bevel stop is in the unblocking position according to an example embodiment of this disclosure.

FIGS. 15-17 illustrate a third example of the bevel stop assembly according to an example embodiment. This third example of the bevel stop assembly includes a first bevel stop 178 and a second bevel stop (not shown). More specifically, FIGS. 15-17 illustrate the first bevel stop 178, which is configured for use on the left side (when facing the front surface 106A of the front plate 106). Although not shown, the second bevel stop includes similar features, but is configured for use on the right side (when facing the front surface 106A of the front plate 106). The first bevel stop 178 includes a mounting portion and a stopper portion. As shown in FIGS. 15-17, the mounting portion includes a mounting plate 180. Also, in this example, the first bevel stop 178 includes a fastener 182 (FIGS. 16-17), the adjusting screw 130, and the nut 136. In addition, as shown in FIGS. 16-17, the first bevel stop 178 is configured to include and interact with a first stopping post 184 and a second stopping post 186, which are located on the front surface 106A of the front plate 106. The first stopping post 184 is configured to provide a first fixed stop. The first stopping post 184 is configured to stop the first bevel stop 178 at the blocking position. The second stopping post 186 is configured to provide a second fixed. The second stopping post 186 is configured to stop first bevel stop 178 at the unblocking position.

The mounting plate 180 includes any suitable shape (e.g., rectangular shape) with a through-hole 154 at the upper, left region of the mounting plate 180 when viewed from a front perspective. In this case, the mounting portion is configured to receive the fastener 182 via the through-hole 154. The fastener 182 is a shoulder screw or any suitable device that provides at least the functions, as described herein. In this case, the fastener 182 has a shank that includes an unthreaded portion, which functions as a bearing surface. In this regard, unlike the other embodiments, the mounting portion is not fixed to the front plate 106, but is configured to rotate about the fastener 182. In this case, the first bevel stop 178 is configured to move about an axis 350 of the fastener 182. The axis 350 is a center, longitudinal axis of the fastener 182. The axis 350 is perpendicular (or substantially perpendicular) to a plane of the front surface of the mounting portion and/or the front surface 106A of the front plate 106.

The mounting portion includes a holder 188. The holder 188 is configured to support the adjusting screw 130 and enable the adjusting screw 130 to move along axis 360 while being supported by the holder 188. The holder 188 is positioned at a bottom portion of the mounting plate 180. The holder 188 is fixed to the mounting plate 180. The holder 188 is spaced from the through-hole and the fastener 182. The holder 188 is positioned with sufficient clearance from the fastener 182 while also being positioned to abut against the first flange 126 when in the blocking position. The holder 188 is a structure, which is configured to surround the adjusting screw 130 and enable the adjusting screw 130 to move within the holder 188 and linearly along an axis 360, which is parallel (or substantially parallel) to a plane of the front surface 106A. The axis 360 is configured to be perpendicular (or substantially perpendicular) to the axis 350 of the fastener 182. The adjusting screw 130 is configured to be oriented in the holder 188 so that the head 132 is configured to confront the first flange 126 when in the blocking position. The adjusting screw 130 is configured to move linearly along the axis 360 to adjust a location of the blocking position by adjusting the amount that the adjusting screw 130 extends outward from the holder 188.

The mounting plate 180 is configured to rotate about the fastener 182 so that the adjusting screw 130 is positioned at a first position ("blocking position"), where the adjusting screw 130 is configured to overlap a first section of the opening 120 and thus obstruct the pathway of the bevel adjustment assembly so that the bevel adjustment assembly stops at a first bevel angle (e.g., zero degrees). For instance, in this example, the mounting plate 180 is in the first position when a first sidewall 180A of the mounting plate 180 abuts against the first stopping post 184 such that the adjusting screw 130 is positioned below the fastener 182. When in the blocking position, the mounting plate 180 is at least mostly oriented vertically and the adjusting screw 130 is at least mostly oriented horizontally. In this regard, as shown in FIG. 16, the adjusting screw 130 is configured to be oriented so that a head 132 of the adjusting screw 130 faces the bevel adjustment assembly. The head 132 provides an abutment surface, which is configured to abut against the first flange 126 to stop the bevel adjustment assembly from continued movement along the first direction 300A. For example, FIG. 16 shows the first bevel stop 178 in the blocking position with the head 132 abutting against an outer surface of the first flange 126 of the bracket 112.

The mounting plate 180 is configured to rotate about the fastener 182 so that the adjusting screw 130 is positioned at a second position ("unblocking position"), where the adjusting screw 130 does not overlap a part (e.g., first section) of the opening 120 (or the pathway) to clear that part (e.g., the first section) of the opening 120 (or the pathway) so that the bevel adjustment assembly is free to move beyond the first bevel angle (e.g. zero degrees) and provide a current bevel angle that is less than the first bevel angle. For instance, in this example, the mounting plate 180 is in the unblocking position when a second sidewall 180B of the mounting plate 180 abuts against the second stopping post 186 such that the mounting plate 180 is at least mostly in a landscape orientation and the adjusting screw 130 is at least mostly oriented vertically. As shown in FIG. 17, when the mounting plate 180 is rotated into the unblocking position, the adjusting screw 130 is located on one side (e.g. right side when viewed from the front) of the fastener 182. Also, as shown in FIG. 17, when the mounting plate 180 is rotated into the unblocking position, the head 132 of the adjusting screw 130 is positioned above the fastener 182. More specifically, for example, when the user wants to position the saw blade 102 at a bevel angle that is less than zero degrees, then the user may rotate the first bevel stop 178 about the fastener 182 until the second sidewall 180B abuts against the second stopping post 186 so that the stopper is out of the way and the bevel adjustment assembly can move into a position along the front plate 106 such that the saw blade 102 is movable to a bevel angle that is less than the first bevel angle (e.g., less than 0 degrees). In this case, when the first bevel stop 178 is in the unblocking position, then the bevel adjustment assembly is configured to move the saw blade 102 to a bevel angle that is less than 0 degrees. When the first bevel stop 178 is in the unblocking position (FIG. 17), the adjusting screw 130 is positioned completely out of the pathway of the bevel adjustment assembly such that no portion of the first bevel stop 178 interferes with a movement of the bevel adjustment assembly, thereby enabling the bevel adjustment assembly to move beyond the first position along the pathway of the front plate 106.

Figure 18:
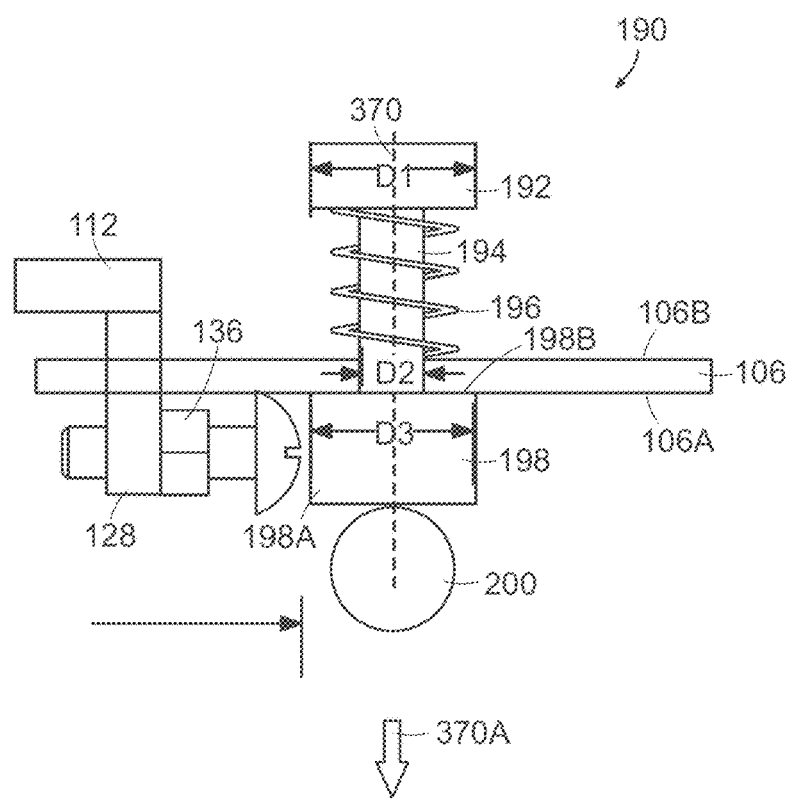
FIG. 18 is a plan view of a second bevel stop of a fourth example of a bevel stop assembly with respect to the second end portion of the bevel adjustment assembly when this second bevel stop is in the blocking position according to an example embodiment of this disclosure.
Figure 19:
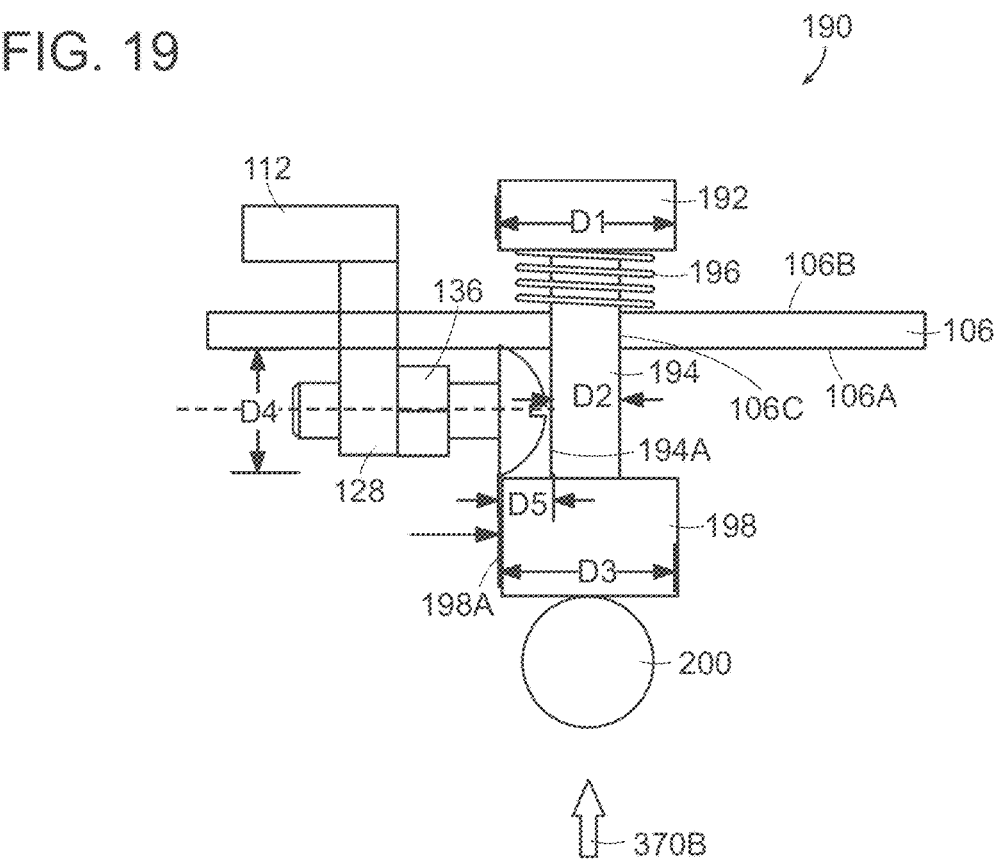
FIG. 19 is a plan view of the second bevel stop of FIG. 18 with respect to the second end portion of the bevel adjustment assembly when this second bevel stop is in the unblocking position according to an example embodiment of this disclosure.

FIGS. 18-19 illustrate a fourth example of the bevel stop assembly according to an example embodiment. This fourth example of the bevel stop assembly includes a first bevel stop (not shown) and a second bevel stop 190. More specifically, FIGS. 18-19 illustrate an example of the second bevel stop 190. Although not shown, the first bevel stop is configured be similar or substantially the same as the second bevel stop 190, but configured for and positioned on an opposite side of the opening 120 of the front plate 106 and/or the bracket 112. In this example, the second bevel stop 190 is connected via a through-hole 106C in the front plate 106. As shown in FIGS. 18-19, the through-hole 106C is positioned adjacent to the opening 120. The second bevel stop 190 includes at least a head portion 192, a shaft portion 194, a spring 196, a stopper 198, and a knob 200. This second bevel stop 190 includes a pull-type of mechanism (e.g., knob 200) to transition from the blocking position (FIG. 18) to the unblocking position (FIG. 19). In addition, when the bevel adjustment assembly moves away from the second bevel stop 190 and along the first direction 300A, then the second bevel stop 190 is configured to transition from the unblocking position to the blocking position via the spring 196 in a self-restoring manner.

The shaft portion 194 includes a first end portion and a second end portion. In this example, as shown in FIGS. 18-19, the head portion 192 and the spring 196 are disposed at the first end portion of the shaft portion 194. The head portion 192 is configured to support the spring 196, which is disposed about the shaft portion 194. A dimension D1 (e.g. width) of the head portion 192 is greater than a dimension D2 (e.g. width) of the shaft portion 194. The stopper 198 and the knob 200 are disposed at the second end portion of the shaft portion 194. The stopper 198 includes a dimension D3 (e.g., width), which is greater than a dimension D2 of the shaft portion 194. The stopper 198 includes a side surface 198A, which is configured to confront and stop the bevel adjustment assembly from moving beyond the second position of the pathway along the second direction 300B. In this example, this second position along the pathway corresponds a second bevel angle of 45 degrees.

Also, the shaft portion 194 is structured to extend and move through the through-hole 106C of the front plate 106. The through-hole 106C is sized to receive the shaft portion 194 and not the spring 196 such that the spring 196 is positioned between the head portion 192 and the rear surface 106B of the front plate 106. The shaft portion 194 is configured to extend along an axis 370 that is perpendicular (or substantially perpendicular) to the front plate 106. The shaft portion 194 is configured to move in a first direction 370A and a second direction 370B, respectively. The first direction 370A is opposite to the second direction 370B. The second bevel stop 190 is configured to move into the blocking position and the unblocking position.

When the second bevel stop 190 is in the blocking position, the second bevel stop 190 overlaps a part of the opening 120 and obstructs the pathway of the bevel adjustment assembly so that the bevel adjustment assembly stops at its current position ("second position") along the pathway that positions the saw blade 102 at the second bevel angle (e.g., 45 degrees). In this regard, the bevel adjustment assembly is configured to travel along the pathway to at least the second position, where the second bevel stop 190 blocks the bevel adjustment assembly from moving further along the pathway in the second direction 300B. When in the blocking position, as shown in FIG. 18, the stopper 198 has a rear surface 198B that is configured to be in contact with the front surface 106A of the front plate 106. Also, when in the blocking position, the side surface 198A of the stopper 198 is configured to serve as an abutment surface for the head 132 of the adjusting screw 130, thereby stopping the bracket 112 from moving beyond its current position. In addition, as shown in FIG. 18, the spring 196 is configured to be in a less-compressed state (or non-compressed state) and/or configured to support and/or urge the stopper 198 towards the front plate 106.

The second bevel stop 190 is also configured to be in the unblocking position. In this regard, for example, if the user wants to position the saw blade 102 at a bevel angle that is greater than the second bevel angle (e.g., 45 degrees) when the second bevel stop 190 is in the blocking position, then the use can pull or move the knob 200 in the first direction 370A so that the second bevel stop 190 moves in the first direction 370A along the axis 370. When the knob 200 is pulled and/or moves in the first direction 370A, then each part of the second bevel stop 190 moves along the first direction 370A with the knob 200. More specifically, for instance, the head portion 192 is configured to move towards the rear surface 106B of the front plate 106 and lessen the distance between the head portion 192 and the rear surface 106B, thereby transitioning the spring 196 into a more compressed state.

In addition, when the knob 200 moves in the first direction 370A, then a part of the shaft portion 194 is configured to move through the through-hole and extend beyond the front surface 106A of the front plate 106. The second bevel stop 190 is configured to move such that at least the shaft portion 194 extends out by a dimension D4, which is configured to provide a side surface 194A that is sized to confront the head 132 of the adjusting screw 130. As shown in FIG. 19, the side surface 194A is configured to confront and abut against the head 132 of the adjusting screw 130 and stop the bevel adjustment assembly from moving beyond its current position along the second direction 300B. Furthermore, as shown in FIG. 19, the dimension D3 of the stopper 198 is greater than the dimension D2 (e.g., a width) of the shaft portion 194. Unlike the stopper 198, which is sized to overlap the opening 120 and obstruct the pathway of the bevel adjustment assembly when in the blocking position, the shaft portion 194 is sized so that the shaft portion 194 does not obstruct the pathway of the bevel adjustment assembly, thereby enabling the bevel adjustment assembly to move to another position, which is beyond the second position along the pathway in the second direction 300B by at least a dimension D5 and which corresponds to a bevel angle that is greater than the second bevel angle (e.g., forty-five degrees). In this example, the dimension D5 is the distance between the side surface 198A of the stopper 198 and the side surface 194A of the shaft portion 194.

Figure 20:
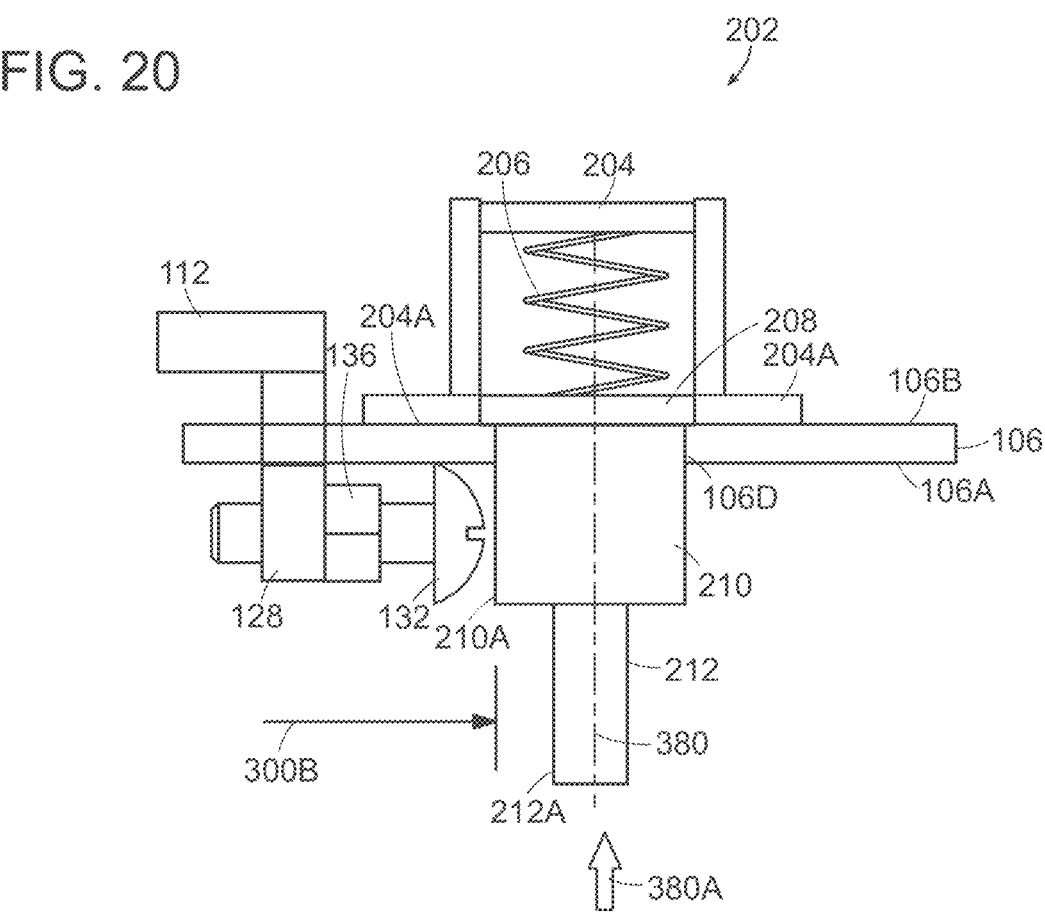
FIG. 20 is a plan view of a second bevel stop of a fifth example of a bevel stop assembly with respect to the second end portion of the bevel adjustment assembly when this second bevel stop is in the blocking position according to an example embodiment of this disclosure.
Figure 21:
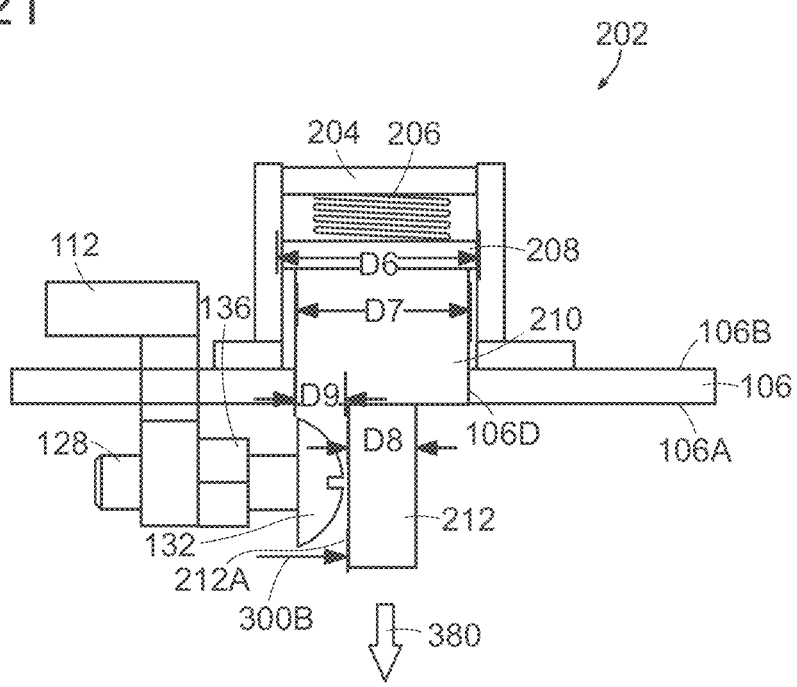
FIG. 21 is a plan view of the second bevel stop of FIG. 20 with respect to the second end portion of the bevel adjustment assembly when this second bevel stop is in the unblocking position according to an example embodiment of this disclosure.

FIGS. 20-21 illustrate a fifth example of the bevel stop assembly according to an example embodiment. This fifth example of the bevel stop assembly includes a first bevel stop (not shown) and a second bevel stop 202. More specifically, FIGS. 20-21 illustrate an example of the second bevel stop 202. Although not shown, the first bevel stop is configured to be similar or substantially the same as the second bevel stop 202, but configured for and positioned on an opposite side of the opening 120 of the front plate 106 and/or the bracket 112. In this example, the second bevel stop 202 is connected via a through-hole 106D in the front plate 106. As shown in FIGS. 20-21, the through-hole 106D is positioned adjacent to the opening 120. The second bevel stop 202 includes at least an enclosure 204, a spring 206, a shoulder 208, a stopper 210, and a knob 212. This second bevel stop 202 includes a push-type of mechanism (e.g., knob 212) to transition from the blocking position to the unblocking position. In addition, when the bevel adjustment assembly is moved away from the second bevel stop 202, the second bevel stop 202 is configured to transition from the unblocking position to the blocking position via the spring 206 in a self-restoring manner.

The enclosure 204 is configured to house and support the spring 206, the shoulder 208, and the stopper 210. In this regard, for example, the enclosure 204 has a hollow interior to receive the spring 206, the shoulder 208, and the stopper 210. In addition, as shown in FIGS. 20-21, the enclosure 204 includes a flange portion 204A, which surrounds an opening of the enclosure 204. The flange portion 204A is configured to be mounted and/or fixed to the rear surface 106B of the front plate 106. The enclosure 204 has a hollow interior. Also, as shown in FIGS. 20-21, the enclosure 204 is aligned with respect to a corresponding through-hole 106D of the front plate 106. The enclosure 204 is positioned to support and receive the spring 206, the shoulder 208, and the stopper 210 as these elements move along the axis 380.

The spring 206 is positioned between an interior surface of the enclosure 204 and a rear surface of the shoulder 208. The shoulder 208 is configured to support the spring 206. The shoulder 208 is also configured to abut against the rear surface 106B of the front plate 106 to position the stopper 210 into the blocking position and ensure that the spring 206 is contained within the enclosure 204. For example, the shoulder 208 has a dimension D6 (e.g., width) that is greater than a dimension D7 (e.g. width) of the stopper 210. The dimension D6 of the shoulder 208 is also greater than a dimension of the through-hole 106D, thereby preventing the shoulder 208 from passing through the through-hole 106D. Meanwhile, the stopper 210 is sized to move through the through hole 106D. Also, in this example, the dimension D8 (e.g., width) of the knob 212 is less than the dimension D7 (e.g., width) of the stopper 210. In addition, the side surface 212A of the knob 212 is offset from the side surface 210A of the stopper 210 by a distance D9.

In addition, the spring 206, the shoulder 208, the stopper 210, and the knob 212 are aligned along an axis 380. In this case, the axis 380 is a center, longitudinal axis of the second bevel stop 202. The axis 380 is perpendicular (or substantially perpendicular) to the front surface 106A and/or the rear surface 106B of the front plate 106. In this regard, the shoulder 208, the stopper 210, the spring 206, and the knob 212 are configured to move in a first direction 380A and a second direction 380B, respectively. The second bevel stop 202 is configured to transition from the unblocking position to the blocking position in a self-restoring manner by being moved in the second direction 380B via the spring 206. The second bevel stop 202 is configured to transition from the blocking position to the unblocking position by being moved (e.g. pushed) in the first direction 380A via the knob 212.

FIG. 20 illustrates an example of when the second bevel stop 202 is in the blocking position. When the second bevel stop 202 is in the blocking position, then the spring 206 is in a less compressed state (or a non-compressed state) and the spring 206 occupies at least a majority of the space of the enclosure 204 such that the stopper 210 is positioned at least mostly on a front side of the front plate 106. In this example, for instance, the stopper 210 is positioned such that at least a part of the shoulder 208 abuts against the rear surface 106B of the front plate 106. Also, the stopper 210 is positioned such that the rear surface of the stopper 210 is flush or substantially flush with the rear surface 106B of the front plate. In addition, the stopper 210 is positioned to protrude outward from the front surface 106A of the front plate 106 to block a pathway of the bracket 112 from moving beyond the second position (e.g., 45 degrees). As shown in FIG. 20, in this example, the adjusting screw 130 is provided on the second flange 128 of the bracket 112. The head 132 of the adjusting screw 130 faces outward from the second flange 128 and towards the second bevel stop 202. When the bevel adjustment assembly and the bracket 112 move in the second direction 300B to increase the bevel angle beyond the second bevel angle (e.g., 45 degrees), then the head 132 of the adjusting screw 130 is configured to abut against a side surface 210A of the stopper 210 when the second bevel stop 202 is in the blocking position, as shown in FIG. 20. The abutment of the bevel adjustment assembly (e.g. head 132 of the adjusting screw 130) with the side surface 210A of the stopper 210 stops the bevel adjustment assembly at its current position ("second position") along the pathway. When the bevel adjustment assembly is in this second position, then the saw blade 102 is positioned at the second bevel angle (e.g. 45 degrees). When the second bevel stop 202 is in the blocking position, the bevel adjustment assembly is not able to continue to move along the pathway in the second direction 300B to another position that corresponds to a bevel angle that is greater than the second bevel angle.

FIG. 21 illustrates an example of when the second bevel stop 202 is in the unblocking position. In this regard, when a user desires a bevel angle that is greater than the second bevel angle, then the user is configured to push or move the knob 212 in a first direction 380A so that the second bevel stop 202 transitions from the blocking position to the unblocking position. When the knob 212 moves towards the front plate 106 and/or the enclosure 204 in this first direction 380A, then the knob 212 moves the stopper 210 along the first direction 380A such that the spring 206 transitions from a less compressed (FIG. 20) state to a more compressed state (FIG. 21). When the spring 206 is in the more compressed state (FIG. 21), then the spring 206 occupies less space in the enclosure 204 compared to the less compressed state or non-compressed state of the spring 206 (FIG. 20). Also, as the stopper 210 moves along the first direction 380A, then the stopper 210 transitions from being at least mostly positioned on the front side of the front plate 106 to being at least mostly positioned on the rear side of the front plate 106. For example, as shown in FIG. 21, the stopper 210 is positioned such that a front surface of the stopper 210 is flush or substantially flush with the front surface 106A of the front plate 106. The stopper 210 is positioned within the enclosure 204 such that the stopper 210 does not protrude outward from the front surface 106A of the front plate 106. In this regard, the stopper 210 does not obstruct the pathway of the bevel adjustment assembly as the bevel adjustment assembly moves along the second direction 300B. When the stopper 210 transitions to the unblocking position and clears itself from the pathway, the bevel adjustment assembly is permitted to move to another position along the pathway that is further along the second direction 300B than the second position by the distance D9 such that the saw blade 102 is enabled to be positioned at a bevel angle that is greater than the second bevel angle.

As discussed above, in this example, the adjusting screw 130 is provided on the second flange 128 of the bracket 112. The head 132 of the adjusting screw 130 faces outward along the second direction 300B and towards the second bevel stop 202. In this case, when the bevel adjustment assembly and the bracket 112 move in the second direction 300B to increase the bevel angle beyond the second bevel angle (e.g., 45 degrees), then the head 132 of the adjusting screw 130 is configured to abut against the side surface 212A of the knob 212 when the second bevel stop 202 is in the unblocking position, as shown in FIG. 21. The abutment of the bevel adjustment assembly (e.g. head 132 of the adjusting screw 130 that is supported by the bracket 112) with the side surface 212A of the knob 212 stops the bevel adjustment assembly at its current position, which positions the saw blade 102 at a bevel angle, which is greater than the second bevel angle. When the stopper 210 transitions from the blocking position to the unblocking position, then the bevel adjustment assembly is permitted to move beyond the second position along the pathway in the second direction 300B by the distance D9. In this example, as shown in FIGS. 20-21, the dimension D9 is the distance between the side surface 210A of the stopper 210 and the side surface 212A of the knob 212.

FIGS. 22-24 illustrate a sixth example of the bevel stop assembly according to an example embodiment. This sixth example of the bevel stop assembly includes a first bevel stop (not shown) and a second bevel stop 214. More specifically, FIGS. 22-24 illustrate a second bevel stop 214 that is configured for use on the right side (when facing the front surface 106A of the front plate 106) of the bevel adjustment assembly. Although not shown, the first bevel stop includes similar features, but is configured for use on the left side (when facing the front surface 106A of the front plate 106) of the bevel adjustment assembly. The second bevel stop 214 includes a stopper 216 and a stopping post 218. As shown in at least FIG. 24, the stopper 216 includes a first portion 216A and a second portion 216B. The first portion 216A includes a through-hole, which is configured to receive a fastener 182, such as a shoulder screw or any suitable device that provides at least the functions, as described herein. The fastener 182 is configured to connect the stopper 216 to the front plate 106 and enable the stopper 216 to move into a blocking position and an unblocking position, respectively. The front plate 106 includes a corresponding through-hole to receive the fastener 182. As shown in FIGS. 22-24, the stopper 216 is configured to rotate about a rotational and/or a center longitudinal axis of the fastener 182. When connected to the front plate 106, the longitudinal axis of the fastener 182 is configured to extend perpendicular (or substantially perpendicular) to the front plate 106.

The second portion 216B includes an elongated member, which extends from a part of the first portion 216A. The elongated member includes at least a first sidewall portion 216C and a second sidewall portion 216D. As shown in FIGS. 22-23, the first sidewall portion 216C is structured to provide an abutment surface to the bevel adjustment assembly (e.g., head 132 of adjusting screw 130). In this example, the first sidewall portion 216C extends tangentially from a surface of the first portion 216A. Also in this example, the first sidewall portion 216C has a size and shape (e.g. curved portion) that corresponds to the head 132 of the adjusting screw 130. In this case, the first sidewall portion 216C protrudes outward from a surface of the stopper 216 and provides an abutment surface that is sized to contact the entire head 132 of the adjusting screw 130. The first sidewall portion 216C may also provide the user with a handle-like portion that is easy to grasp and move the second bevel stop 214 into the blocking position and unblocking position, respectively. The second sidewall portion 216D is disposed on a side of elongated member that is opposite to the first sidewall portion 216C. The second sidewall portion 216D is structured to abut against a lateral surface 218A of the stopping post 218 to position the stopper 216 in the blocking position. Also, the stopping post 218 is configured to maintain the stopper 216 in the blocking position when the bevel adjustment assembly abuts against the second bevel stop 214. As shown in FIGS. 22-24, the stopping post 218 is secured to the front plate 106 and configured to provide a fixed stop for stopping the second bevel stop 214 so that the second bevel stop 214 is in the blocking position.

In the default state, the second bevel stop 214 is positioned in the blocking position, as the configuration (e.g., weight and position) of the second portion 216B with respect to the first portion 216A causes the second bevel stop 214 to move into the blocking position at least due to gravity. For example, as shown in FIG. 23, when the second bevel stop 214 is in the blocking position, then the second bevel stop 214 is in contact with the stopping post 218. More specifically, the second sidewall portion 216D is in contact with the lateral surface 218A of the stopping post 218 when the second bevel stop 214 is in the blocking position. For instance, in FIG. 23, when the second bevel stop is in the blocking position, then the first sidewall portion 216C is positioned to confront and abut against the head 132 of the adjusting screw 130 to stop the bevel adjustment assembly from moving beyond the second position along the pathway in the second direction 300B. In addition, the stopping post 218 is configured to support to the second bevel stop 214 in the blocking position when the bevel adjustment assembly pushes against the first sidewall portion 216C of the second bevel stop 214. When the bevel adjustment assembly abuts against the second bevel stop 214, then the bevel adjustment assembly stops at the second position along the pathway such that the bevel adjustment assembly positions the saw blade 102 at the second bevel angle (e.g., 45 degrees). After the bevel adjustment assembly is moved in the first direction 300A by an amount that provides sufficient clearance for the second bevel stop 214 to move, then the second bevel stop 214 can be rotated in the first direction 390A to transition from the blocking position to the unblocking position.

In the event that a user desires a bevel angle that is greater than the second bevel angle, then the user simply moves or rotates the stopper 216 in the first direction 390A about the axis so that the stopper 216 moves out of the pathway of the bevel adjustment assembly. For example, the user may handle the protruding part of the first sidewall portion 216C of the second bevel stop 214 to move the stopper 216 in the first direction 390A. In this case, as shown in FIG. 24, the second bevel stop 214 is rotated in the first direction 390A and away from the stopping post 218 so that the stopper 216 is positioned above the opening 120. The stopper 216 is spaced from the opening 120 such that the stopper 216 does not overlap the opening 120 and the bevel adjustment assembly has a clear path for moving into a position corresponding to a bevel angle that is greater than the second bevel angle. Also, the upper surface 218B of the stopping post 218 is positioned under the first portion 216A of the second bevel stop 214 in the unblocking position.

As shown in FIG. 24, when the second bevel stop 214 is rotated into the unblocking position, the bevel adjustment assembly is configured to move to another position, which is further along the second direction 300B than the second position. When the bevel adjustment assembly is not obstructed by the second bevel stop 214, then the bevel adjustment assembly is configured to position the saw blade 102 to another bevel angle, which is greater than the second bevel angle (e.g., 45 degrees). In this regard, when the second bevel stop 214 is in the unblocking position, the bevel adjustment assembly is configured to move an additional amount along the second direction 200B. The additional amount is defined between the second position and the another position along the pathway. The additional amount may correspond to the width of the second portion 216B. The additional amount may correspond to the distance between the second position and the end of the pathway, which is defined by the sidewall portions 122 that define the opening 120. Furthermore, once the bevel adjustment assembly moves away from the second bevel stop 214 along the first direction 300A and the second bevel stop 214 is no longer supported in the unblocking position, then the second bevel stop 214 is configured to move in the second direction 390B and into the blocking position in a self-restoring manner, for example, due to the configuration of the second portion 216B with respect to the first portion 216A and also gravity. In addition, when moving in the second direction 390B, the second bevel stop 214 is configured to be set into the blocking position upon abutting against the stopping post 218.

As discussed herein, the embodiments include a number of advantageous features, as well as benefits. For example, the embodiments include bevel stop assemblies, which enable one or more bounds of the bevel adjustment assemblies to be set and/or released quickly and easily at convenient locations of the power tool apparatuses. The embodiments include examples of first bevel stops, which are configured to provide first bounds for the bevel adjustment assemblies so that the bevel adjustment assemblies are limited to positions along the pathways that bound the power tools (e.g., saw blades 102) with respect to the first predetermined bevel angles (e.g., 0 degrees). More specifically, when the first bevel stops are in the blocking positions, then the bevel adjustment assemblies are disabled from positioning the power tools at bevel angles that are less than the first predetermined bevel angles (e.g., less than 0 degrees) while enabling the power tools to be positioned at bevel angles that are equal to or greater than first predetermined bevel angles (e.g., equal to or greater than 0 degrees).

Also, these first bevel stops are configured to be released as the first bounds so that the bevel adjustment assemblies are not limited with respect to positions along the pathways that would otherwise bound the power tools with respect to the first predetermined bevel angles. In this regard, the pathways are cleared from being obstructed by the first bevel stops. When the first bevel stops are in the unblocking positons, then the bevel adjustment assemblies are permitted and enabled to move into positions that place the power tools at bevel angles that are less than the first predetermined bevel angles (e.g., less than 0 degrees) while also being permitted and enabled to place the power tools at bevel angles that are equal to or greater than first predetermined bevel angles (e.g., equal to or greater than 0 degrees). When the first bevel stops are in the unblocking positons, then the bevel adjustment assemblies are not bounded by the first bevel stops at the first sections or the first end portions of the pathways, but may be bounded by other structures, such as corresponding sidewall portions 122. Advantageously, these first bevel stops are movable into the blocking positions and the unblocking positions, respectively, with ease. In addition, these first bevel stops are configured to transition from the unblocking positions to the blocking positions via self-restoration. For example, these first bevel stops may be held in the unblocking positions by users, and restored to the blocking positions when the users release their hold of the first bevel stops in the unblocking positions.

In addition, the embodiments include examples of second bevel stops, which are configured to provide second bounds for the bevel adjustment assemblies so that the bevel adjustment assemblies are limited to positions along the pathways that bound the power tools (e.g., saw blades 102) with respect to the second predetermined bevel angles (e.g., 45 degrees). More specifically, when the second bevel stops are in the blocking positions, then the bevel adjustment assemblies are disabled from placing the power tools at bevel angles that are greater than the second predetermined bevel angles (e.g., greater than 45 degrees) while being permitted and enabled to place the power tools at bevel angles that are equal to or less than the second predetermined bevel angles (e.g., equal to or less than 45 degrees).

Also, these second bevel stops are configured to be released as the second bounds so that the bevel adjustment assemblies are not limited with respect to positions along the pathways would otherwise bound the power tools with respect to the second predetermined bevel angles. In this regard, the pathways are cleared from being obstructed by the second bevel stops. When the second bevel stops are in the unblocking positons, then the bevel adjustment assemblies are permitted and enabled to move into positions that place the power tools at bevel angles that are greater than the second predetermined bevel angles (e.g., greater than 45 degrees) while also being permitted and enabled to place the power tools at bevel angles that are equal to or less than the second predetermined bevel angles (e.g., 45 degrees). When the second bevel stops are in the unblocking positons, then the bevel adjustment assemblies are not bounded by the second bevel stops at the second sections or the second end portions of the pathways, but may be bounded by other structures, such as corresponding sidewall portions 122. Advantageously, these second bevel stops are enabled to be moved into the blocking positions and unblocking positions, respectively, with ease. In addition, these first bevel stops are configured to transition from the unblocking positions to the blocking positions via self-restoration. For example, these second bevel stops may be held in the unblocking positions by users, and restored to the blocking positions when the users release their hold of the second bevel stops in the unblocking positions.

Advantageously, the embodiments are structured such that the first bevel stops and the second bevel stops are operable on front surfaces 106A of side panel portions (e.g. front panel portions), thereby providing easy access for users to set and release bounds for the bevel adjustment assemblies. In addition, the embodiments are advantageous in that the first bevel stops are configured to move into the blocking position and the unblocking position, respectively, with ease and without requiring the use of any tools. Similarly, the second bevel stops are configured to move into the blocking position and the unblocking position, respectively, with ease and without requiring the use of any tools. In addition, the first bevel stops are configured to return to default positions (e.g., blocking positions) via self-restoration, for example, by gravity, a spring, or any suitable means, thereby relieving users of the burdens of resetting the first bevel stops. Likewise, the second bevel stops are configured to return to default positions (e.g., blocking positions) via self-restoration, for example, by gravity, a spring, or any suitable means, thereby relieving users of the burdens of resetting the second bevel stops.

That is, the above description is intended to be illustrative, and not restrictive, and provided in the context of a particular application and its requirements. Those skilled in the art can appreciate from the foregoing description that the present invention may be implemented in a variety of forms, and that the various embodiments may be implemented alone or in combination. Therefore, while the embodiments of the present invention have been described in connection with particular examples thereof, the general principles defined herein may be applied to other embodiments and applications without departing from the spirit and scope of the described embodiments, and the true scope of the embodiments and/or methods of the present invention are not limited to the embodiments shown and described, since various modifications will become apparent to the skilled practitioner upon a study of the drawings, specification, and following claims. For example, components and functionality may be separated or combined differently than in the manner of the various described embodiments, and may be described using different terminology. These and other variations, modifications, additions, and improvements may fall within the scope of the disclosure as defined in the claims that follow.

What is claimed is:

1. A power tool apparatus comprising:
a power tool assembly including a tool and an actuator configured to actuate the tool;
a support assembly configured to support the power tool assembly, the support assembly including a work surface and a side panel portion, the side panel portion including at least an exterior surface;
a bevel adjustment assembly configured to move to at least a first position and a second position along a pathway of the side panel portion, the first position corresponding to a first bevel angle, the second position corresponding to a second bevel angle, the bevel adjustment assembly including a bracket with a first flange that extends outward from a front side of the bracket and perpendicular to a middle portion of the bracket, the first flange protrudes outward from the exterior surface of the side panel portion; and
a first bevel stop including (a) a mounting plate that is secured to the exterior surface of the side panel portion, the mounting plate having (i) a front surface that includes a first tab and a second tab, the first tab and the second tab protruding outward from the front surface and supporting an axle, and (ii) a rear surface that is configured to contact the exterior surface of the side panel portion and (b) a first stopper having an arm positioned between the first tab and the second tab, the arm being movable about the axle into (i) a first blocking position in which the first stopper confronts the first flange and prevents the bevel adjustment assembly from moving beyond the first position along a first direction so that the power tool is bounded at the first bevel angle, and (ii) a first unblocking position in which the bevel adjustment assembly is permitted to move in the first direction beyond the first position to the second position so that the power tool is not bounded at the first bevel angle and permitted to be positioned at the second bevel angle,
wherein,
the bevel adjustment assembly is configured to move away from the first bevel stop in a second direction when the first bevel stop is in the first blocking position, and
the bevel adjustment assembly is configured to move away from the first bevel stop in the second direction when the first bevel stop is in the first unblocking position.

2. The power tool apparatus of claim 1, wherein:
the bevel adjustment assembly further comprises a second flange that is structured to protrude outward from the exterior surface of the side panel portion; and
the power tool apparatus further comprises a second bevel stop mounted to the exterior surface of the side panel portion, the second bevel stop including a second stopper that is configured to move into (i) a second blocking position in which the second stopper confronts the second flange and prevents the bevel adjustment assembly from moving beyond a third position along the second direction so that the power tool is bounded at a third bevel angle, and (ii) a second unblocking position in which the bevel adjustment assembly is permitted to move to a fourth position, the fourth position being further along the second direction than the third position so that the power tool is not bounded at the third bevel angle and enabled to be positioned at a fourth bevel angle,
wherein,
the bevel adjustment assembly is configured to move away from the second bevel stop in the first direction when the second bevel stop is in the second blocking position, and
the bevel adjustment assembly is configured to move away from the second bevel stop in the first direction when the second bevel stop is in the second unblocking position.

3. The power tool apparatus of claim 2, wherein:
the bracket includes the second flange;
the first flange is disposed at a first end portion of the bracket; and
the second flange is disposed at a second end portion of the bracket that is opposite to the first end portion.

4. The power tool apparatus of claim 2, wherein:
the first bevel angle is zero degrees;
the second bevel angle is less than the first bevel angle;
the third bevel angle is 45 degrees; and
the fourth bevel angle is greater than the third bevel angle.

5. The power tool apparatus of claim 2, wherein:
the first stopper supports a first adjuster that enables the first blocking position to be adjusted; and
the second stopper supports a second adjuster that enables the second blocking position to be adjusted.

6. The power tool apparatus of claim 1, further comprising:
a first adjuster that enables the first blocking position to be adjusted;
wherein
the arm includes a first end portion that is rotatable about the axle, and
the arm includes a second end portion that supports the first adjuster.

7. The power tool apparatus of claim 1, wherein the first tab extends further along a length of the arm than the second tab such that the first tab is configured to provide additional support for the arm when the bevel adjustment assembly abuts against the first stopper.

8. A saw apparatus comprising:
a saw blade;
a motor configured to drive the saw blade;
an undercarriage configured to support the motor;
a bevel adjustment assembly configured to move the saw blade to various bevel angles, the bevel adjustment assembly including a bracket with a first flange that extends outward from a front side of the bracket and perpendicular to a middle portion of the bracket;
a support assembly to support the saw blade and the undercarriage with the motor, the support assembly including a work surface and a side panel portion, the side panel portion including an opening defined by sidewall portions that enable the bracket to move along a pathway as the bevel adjustment assembly moves relative to the side panel portion, the side panel portion including an exterior surface; and
a first bevel stop including (a) a mounting plate that is secured to the exterior surface of the side panel portion, the mounting plate having (i) a front surface that includes a first tab and a second tab, the first tab and the second tab protruding outward from the front surface and supporting an axle, and (ii) a rear surface that is configured to contact the exterior surface and (b) a first stopper having an arm positioned between the first tab and the second tab, the arm being configured to move about the axle into (i) a first blocking position in which the first stopper obstructs the pathway and confronts the first flange to prevent the bracket from moving beyond a first position along the pathway in a first direction such that the saw blade is bounded at a first bevel angle, and (ii) a first unblocking position in which the pathway is not obstructed by the first stopper such that the bracket is permitted to move along the pathway to a second position that is beyond the first position in the first direction so that the saw blade is configured to be at a second bevel angle,
wherein,
the first flange protrudes outward from the exterior surface of the side panel portion,
the bracket is configured to move away from the first bevel stop in a second direction when the first bevel stop is in the first blocking position, and
the bracket is configured to move away from the first bevel stop in the second direction when the first bevel stop is in the first unblocking position.

9. The saw apparatus of claim 8, wherein:
the first stopper overlaps a portion of the pathway to obstruct the bracket from moving further along the pathway in the first direction when the first bevel stop is in the first blocking position; and
the first stopper does not overlap the portion of the pathway and enables the bracket to move further along the pathway in the first direction when the first bevel stop is in the first unblocking position.

10. The saw apparatus of claim 8, further comprising:
a second bevel stop mounted to the exterior surface of the side panel portion, the second bevel stop including a second stopper that is configured to move into (a) a second blocking position to obstruct the pathway and stop the bracket from moving beyond a third position along the pathway in the second direction so that the saw blade is bounded at a third bevel angle, and (b) a second unblocking position to clear the pathway and enable the bracket to move to a fourth position that is beyond the third position along the pathway in the second direction so that the saw blade is configured to be at a fourth bevel angle,
wherein,
the bracket is configured to move away from the second bevel stop in the first direction when the second bevel stop is in the second blocking position, and
the bracket is configured to move away from the second bevel stop in the second direction when the second bevel stop is in the second unblocking position.

11. The saw apparatus of claim 10, wherein:
the first bevel angle is zero degrees;
the second bevel angle is less than the first bevel angle;
the third bevel angle is 45 degrees; and
the fourth bevel angle is greater than the third bevel angle.

12. The saw apparatus of claim 10, wherein:
the first stopper is configured to rotate about a first axis to move into the first blocking position and the first unblocking position, respectively;
the first axis is parallel to the side panel portion;
the second stopper is configured to rotate about a second axis to move into the second blocking position and the second unblocking position, respectively; and
the second axis is parallel to the side panel portion.

13. The saw apparatus of claim 10, wherein:
the first stopper supports a first adjuster;
the first adjuster is movable along the first stopper to enable a location of the first blocking position to be adjusted;
the second stopper supports a second adjuster; and
the second adjuster is movable along the second stopper to enable a location of the second blocking position to be adjusted.

14. A saw apparatus comprising:
a saw blade;
a table with a work surface and a side panel portion, the side panel portion including an exterior surface;
a bevel adjustment assembly configured to adjust the saw blade to various bevel angles as the bevel adjustment assembly moves to various positions along a pathway of the side panel portion, the bevel adjustment assembly including a bracket with a first flange that extends outward from a front side of the bracket and perpendicular to a middle portion of the bracket the first flange protrudes outward from the exterior surface of the side panel portion; and a bevel stop assembly including at least a first bevel stop the first bevel stop including (a) a mounting plate that is secured to the exterior surface of the side panel portion, the mounting plate having (i) a front surface that includes a first tab and a second tab, the first tab and the second tab protruding outward from the front surface and supporting an axle, and (ii) a rear surface that is configured to contact the exterior surface and (b) a first stopper having an arm positioned between the first tab and the second tab, the arm being configured to move about the axle to (i) a first blocking position in which the first stopper obstructs a first section of the pathway to confront the first flange and stop the bevel adjustment assembly from moving beyond a first position of the pathway along a first direction such that the saw blade is bounded at a first bevel angle corresponding to the first position, and (ii) a first unblocking position in which the first stopper does not obstruct the first section of the pathway such that the bevel adjustment assembly is permitted to move to a second position that is further along the pathway in the first direction than the first position such that the saw blade is not bounded at the first bevel angle and permitted to move to a second bevel angle corresponding to the second position.

15. The saw apparatus of claim 14, wherein:

the bevel stop assembly includes at least a second bevel stop that is disposed on the exterior surface, the second bevel stop including a second stopper that is configured to move to (i) a second blocking position in which the second stopper obstructs a second section of the pathway to stop the bevel adjustment assembly from moving beyond a third position of the pathway along a second direction such that the saw blade is bounded at a third bevel angle corresponding to the third position, and (ii) a second unblocking position in which the second stopper clears the second section of the pathway to enable the bevel adjustment assembly to move to a fourth position that is further along the pathway in the second direction than the third position such that the saw blade is not bounded at the third bevel angle and enabled to move to a fourth bevel angle corresponding to the fourth position.

16. The saw apparatus of claim 15, wherein:

the first stopper supports a first adjuster;

the first adjuster is movable along the first stopper to adjust a location of the first blocking position;

the second stopper supports a second adjuster; and the second adjuster is movable along the second stopper to adjust a location of the second blocking position.

* * * * *